(12) United States Patent  
Vanier et al.

(10) Patent No.: US 8,515,047 B1  
(45) Date of Patent: Aug. 20, 2013

(54) METHOD AND SYSTEM FOR PRIORITIZING THE PRESENTATION OF INFORMATION WITHIN A DIRECTORY ASSISTANCE CONTEXT WIRELESS AND LANDLINE TELEPHONE SYSTEMS

(75) Inventors: Andre Denis Vanier, Palo Alto, CA (US); Dinoo Jal Vanier, San Diego, CA (US); Faisal N. Jawdat, Pittsburgh, PA (US); Michael W. Slemmer, Oakland, CA (US)

(73) Assignee: Grape Technology Group, Inc., Bethlehem, PA (US)

( * ) Notice: Subject to any disclaimer, the term of this patent is extended or adjusted under 35 U.S.C. 154(b) by 1676 days.

(21) Appl. No.: 11/409,508

(22) Filed: Apr. 20, 2006

Related U.S. Application Data

(60) Provisional application No. 60/673,289, filed on Apr. 20, 2005.

(51) Int. Cl.
*H04M 3/42* (2006.01)
*H04M 15/00* (2006.01)

(52) U.S. Cl.
USPC .................................. 379/218.01; 379/114.13

(58) Field of Classification Search
USPC ............. 379/218.01, 265.01, 265.02, 265.03, 379/265.04, 265.05, 265.06, 265.07, 265.08, 379/265.09, 265.1, 265.11, 265.12, 265.13, 379/265.14, 266.01, 266.02, 266.03, 266.04, 379/266.05, 266.06, 266.07, 266.08, 266.09, 379/266.1, 114.13
See application file for complete search history.

(56) References Cited

U.S. PATENT DOCUMENTS

| 5,848,396 | A | * | 12/1998 | Gerace ............................ 705/10 |
| H2187 | H | | 4/2007 | Yuchimiuk |
| 7,212,615 | B2 | | 5/2007 | Wolmuth |
| 2003/0007620 | A1 | * | 1/2003 | Elsey et al. .............. 379/218.01 |
| 2003/0026409 | A1 | * | 2/2003 | Bushey et al. ........... 379/211.02 |
| 2004/0161094 | A1 | * | 8/2004 | Martin et al. ............ 379/218.01 |
| 2006/0072734 | A1 | | 4/2006 | Baumeister et al. |
| 2006/0173915 | A1 | * | 8/2006 | Kliger ........................ 707/104.1 |

* cited by examiner

*Primary Examiner* — Khai N Nguyen
(74) *Attorney, Agent, or Firm* — Sofer & Haroun, LLP

(57) ABSTRACT

A method of operating a directory assistance system is provided. The method includes receiving a number of directory assistance requests for information regarding at least one of a number of businesses. The number of directory assistance requests comes from a group of callers. The method also includes tracking a frequency with which information regarding the at least one of the number of businesses is requested, defining a number of business categories, and providing a business database comprising a listing of a number of businesses associated with at least one of the number of business categories. The method further includes receiving a directory assistance request including a business category from a caller and presenting a listing of businesses to the caller. An order of presentation is based on the frequency.

23 Claims, 11 Drawing Sheets

Figure 1 - Network Layout

Figure 4 - Arbitrating Advertisements (Part 1)

Figure 6 – Arbitrating Advertisements (Part 3)

Figure 7 - Supplemental Databases

Figure 8 – Selecting Requested Information

US 8,515,047 B1

METHOD AND SYSTEM FOR PRIORITIZING THE PRESENTATION OF INFORMATION WITHIN A DIRECTORY ASSISTANCE CONTEXT WIRELESS AND LANDLINE TELEPHONE SYSTEMS

CROSS-REFERENCES TO RELATED APPLICATIONS

This application claims priority to U.S. Provisional Application No. 60/673,289, filed Apr. 20, 2005, the disclosure of which is hereby incorporated by reference in its entirety for all purposes.

BACKGROUND OF THE INVENTION

This invention generally relates to techniques for providing information to callers in a telephone system. More particularly, the present invention provides a set of innovations that enable an advertiser supported service to offer callers access to information that previously could generally be accessed via proprietary and expensive networks controlled by telecom monopolists and incumbents. The method and system can be applied to other applications as well.

In previous eras, information about business and residential telephone numbers could typically be accessed through print directories and government records. Approximately four decades ago, standardized telephone information systems emerged. Designed around common access codes (e.g., 411) such systems enabled callers to look up business and residential telephone numbers for free. Up until recently, such systems were available to consumer and business customers at no charge or a nominal charge. In recent years, the prices began to increase. Today, the average pricing on landline US 411 calls is over $0.80 for local look-ups and $1.50 for national queries. Cellular 411 calls are generally at least $1.25.

Meanwhile, in recent years, advances in the marketing discipline and rapid strides in technology have empowered advertisers to identify and cater to consumer as well as business customers based on a host of different identifying criteria. As a result, ad messages geared to the identified target market(s) result in a more productive use of advertising resources than would otherwise occur. Embodiments of the present invention provide a methodology for marketers to reduce expenditures on "wasteful advertising", i.e., advertising not received by the advertiser's aimed-for target market(s). Embodiments of the present invention optimize advertising efficiency by a system of delineating current/prospective customers (through opt-in telephone calls) and matching these particular callers to advertising messages transmitted through free information services, by means of a toll free telephone number, including but not limited to directory assistance. Exposure and responsiveness to each ad are recorded in real time, thereby providing the advertiser with accurate and timely measurement and feedback. In capturing audience receptivity to the relayed ad, the system also enables the advertiser to evaluate the appeal of the message and, importantly, to engage in immediate follow-up on a contact initiated by the customer. Not only is the advertiser facilitated in evaluating the efficacy of the ad but the resultant insights can be utilized in assessing the validity of the advertiser's data base of customer identifiers. Notably, advertiser risk is minimized in that the system can incorporate a Pay for Performance feature designed around customers affirmatively indicating a desire to connect to a given advertiser.

Marketers today have an array of sophisticated methodologies capturing a host of different variables to more accurately identify characteristics profiling target customers. Where the market is comprised of consumers, the profiling of customers encompasses demographics, psychographics, purchasing preferences and buying behaviors. For business customers, the profiling includes variables such as type of business, number of employees, sales size, dollar volume of purchases, number of years in operation and other characteristics representative of the target market sought by the marketer. For both consumer and business categories of customers, profiling permits listing of individual identities and facilitates direct marketing to those particular individuals/households or businesses. Marketing strategies customized for these profiled entities allow for effective one-to-one marketing, whether it be B2C (i.e., business-to-consumer) or B2B (i.e., business-to-business). Such customer identification also permits prioritization of customers for direct marketing thereby enhancing the productivity of marketing expenditures. Furthermore, pioneering statistical work being done today in the field of marketing involves predictive models that assign cluster-profiles at the household level. Not aimed at individuals per se, these models enable firms to classify households according to psychographic and geo-demographic variables as well as prior purchase patterns. The arsenal of large companies in researching and maintaining databases of customers, past, current, and prospective, necessitates a very substantial allocation of resources. Given that it is generally desirable to mine such data effectively, it is compelling that the advertising medium's audience is congruent with the advertiser's targeting of customers to the greatest extent possible.

The use of the telephone to transmit advertising messages is widespread especially as it relates to telemarketing, or to businesses advertising to customers while "on hold" or to customers seeking a particular product or service by means of a toll free number.

Whereas, telephone systems have been extensively used for telemarketing, the recent "Do Not Call Registry" will severely curb the use of this advertising medium. Already some 64 million telephone numbers have been listed on the registry and marketers who use the telephone as a marketing tool need new approaches to contact potential customers. The directory assistance medium wherein consumers/businesses respond to the advertiser's message by choosing to opt-in for contact with the advertiser represents a new communication strategy.

Customer fatigue with advertising in traditional media, combined with the clutter of mass media continues to diminish the effectiveness of such media.

There thus is a need in the art for improved business category search within telephone directory assistance.

SUMMARY OF THE INVENTION

According to the present invention, a system and method for the ordering of listings in a directory assistance business category based search is provided. This invention further details a method and system for the real-time matching of advertisements with callers in a telephone directory system.

According to an embodiment of the present invention, a method of operating a directory assistance system is provided. The method includes receiving a number of directory assistance requests for information regarding at least one of a number of businesses. The number of directory assistance requests comes from a group of callers. The method also includes tracking a frequency with which information regarding the at least one of the number of businesses is requested, defining a number of business categories, and providing a business database comprising a listing of a number of businesses associated with at least one of the number of business categories. The method further includes receiving a directory assistance request including a business category from a caller and presenting a listing of businesses to the caller. An order of presentation is based on the frequency.

According to another embodiment of the present invention, a method of operating a directory assistance system is provided. The method includes defining a plurality of business categories, providing a business database comprising a listing of a plurality of businesses associated with at least one of the plurality of business categories, and receiving a plurality of directory assistance requests from a group of callers. The requests include a business category. The method also includes presenting a listing of businesses in response to the plurality of directory assistance requests, providing an option to select a business from the listing of businesses, and establishing a response rate by tracking a number of callers from the group of callers who select the business. The method further includes receiving a directory assistance request from a caller requesting a business category and presenting a listing of businesses in response to the directory assistance request. An order of presentation is based on the response rate.

According to yet another embodiment of the present invention, a method of operating a directory assistance system is provided. The method includes receiving a directory assistance call from a caller requesting information, presenting an advertisement from a business to the caller, and tracking a response rate to the advertisement. The method also includes defining a plurality of business categories, providing a business database comprising a listing of a plurality of businesses associated with at least one of the plurality of business categories, and receiving a directory assistance request from a caller requesting a business category. The method further includes presenting a listing of businesses in response to the directory assistance request. An order of presentation is based on the response rate to the advertisement.

Embodiments of the present invention provide a structured methodology that is used to determine advertiser preferences in real time, as the call is being placed. Embodiments of the present invention allow advertisers to target advertisements more precisely, and in a timelier fashion.

Embodiments of the present invention combine multiple approaches to determine a call's useful characteristics and rely on the advertiser to provide more specific information regarding the target callers, either in advance or at the moment of the call. Moreover, the system supports utilization of predicted caller characteristics information to match advertisements to callers.

Embodiments of the present invention provide for a database of advertisements developed by or in conjunction with advertisers. It similarly provides for an index of phone numbers and associated characteristics that can be queried to ascertain matches to advertisements based on advertiser preferences. Additionally, embodiments of the present invention incorporate design features that allow access to a network application programmer interface (API) to advertisers' own databases that provide similar functionality as a database lookup.

The qualities used to match a call to an advertisement range from the specific to the general, and can include but are not limited to the phone number from which the call was placed (i.e., ANI, available for the vast majority of calls), the phone number to which the call was placed (i.e., DNIS), calling number information (i.e., ANI II digits, from Flex-ANI), caller location (e.g., based on a global positioning system or some other location based positioning system) gender (e.g., based on analysis of the caller's voice), estimation of age (e.g., based on an analysis of caller's vocal patterns), caller history, the information the caller is requesting, information supplied by third parties about the calling ANI, and additional information from the caller (e.g. questions a CSR or IVR asks).

Based on the information the system has stored or determines in real time about the caller, the system can query databases provided by advertisers either as a local copy or via real-time access to database servers run by advertisers, using a pre-specified API. This approach enables the determination of a set of candidate advertisements to play, and then broadcasts the advertisement deemed most relevant to the caller. The choice of the ad to play for an advertiser can be based on the advertisers' preferences with respect to that caller. After playing the advertisement, the caller can hear the information originally requested such as a directory look-up.

Embodiments of the present invention incorporate a telephony switch, a call center, an interactive voice response unit (IVR), a number of database servers, an application server for the call center, and the InfoAd server. The telephony switch interfaces to the public telephone network, and routes calls to the IVR and the call center. The call center uses the CSR application server to handle calls. The InfoAd server manages the entire system, queries the various databases for information and advertisements, and manages the call flow by directing the IVR and switch to route calls, play advertisements, and more.

Typically when a call arrives, the InfoAd Server begins tracking information about the caller, beginning with the ANI, adding any information known about that ANI (historical information and other information from third party databases), and any information it can determine about the caller including, but not limited to, geographic location, probable gender and the information the caller is seeking.

Embodiments of the present invention provide for this information to be used to ascertain the ads advertisers would prefer to be broadcast. This is done by querying a database of advertisements and rules that the advertiser has provided, or by querying a server that advertisers have created to answer these queries. These databases and servers can map advertisements directly to caller phone numbers or, for cases where there is no direct ANI match, provide rules for selecting advertisements based on other information in the system such as demographic\psychographic\purchase behavior data, session data, or otherwise.

Embodiments of present invention provide for the querying of the Advertiser Preferences DB and Servers to secure a list of advertisements to play for each call. Based on this list and the advertisers' preferences, InfoAd will play an advertisement for the caller. In general InfoAd can play the ad most preferred by the advertiser. If multiple advertisers wish to play an advertisement, the InfoAd Server will make a decision as to which one to play so as to not overload the user with advertisements. If no advertisements are preferred, the server may direct the system to play an unrelated ad, or no ad at all.

According to some embodiments of the present invention, the call ends when the caller hears the advertisement, receives the originally requested information and hangs up. An option may also be offered for callers to be call-forwarded, and advertisers may have the option to provide an affirmative action a user can take such as "press * or press any button to hear more" which would result in additional recorded information being played, the call being forwarded to a number the advertiser specifies, or some other appropriate action.

Many benefits are achieved by way of the present invention over conventional techniques. For example, embodiments of the present invention provide enhanced directory assistance systems with an improved user experience. Depending upon the embodiment, one or more of these benefits, as well as other benefits, may be achieved. These and other benefits will be described in more detail throughout the present specification and more particularly below in conjunction with the following drawings.

DESCRIPTION OF THE SPECIFIC EMBODIMENTS

Figure 1:
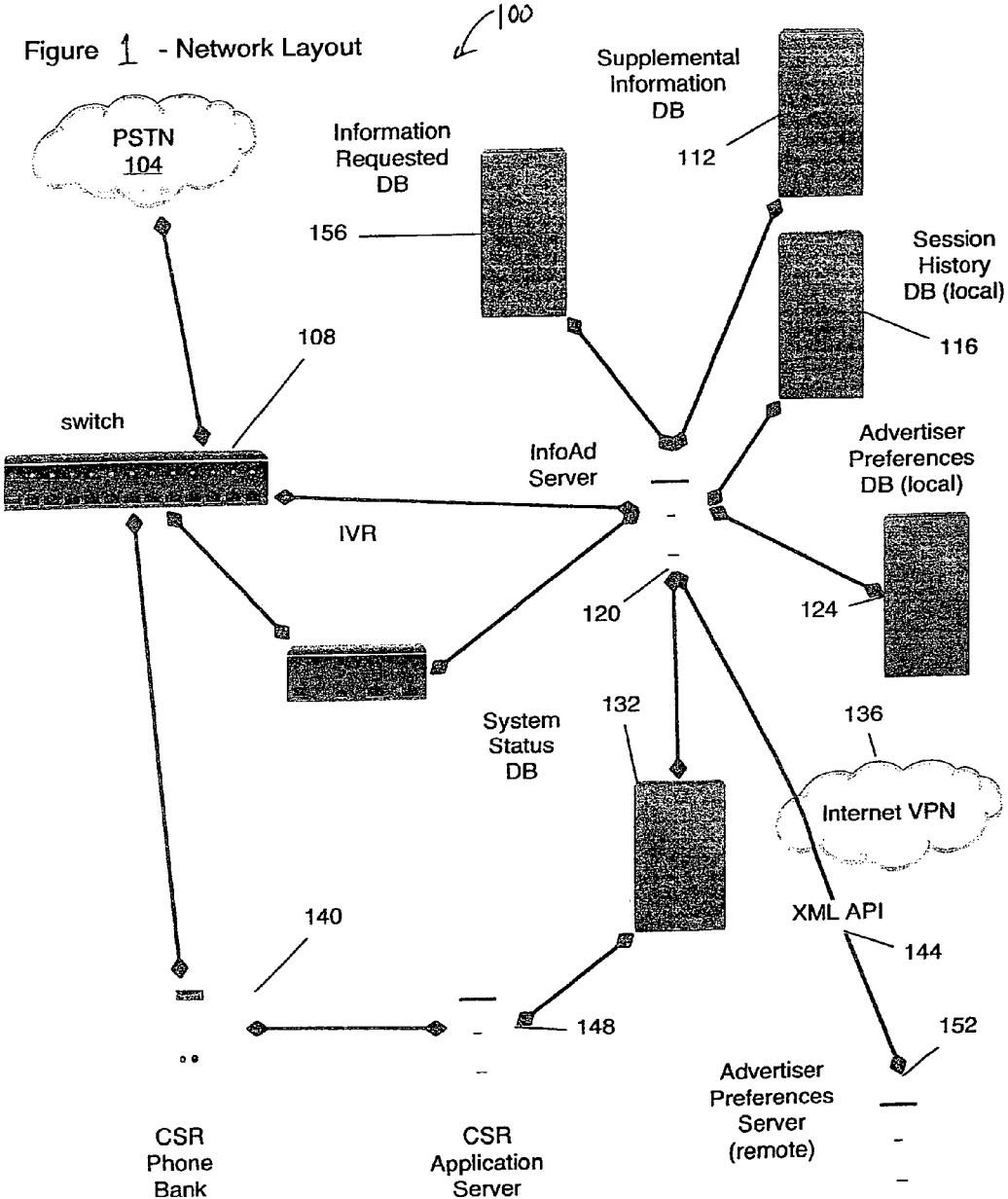
FIG. 1 is a simplified diagram of the database, server, IVR, API, switch and phone bank components according to an embodiment of the present invention.

One example using an exemplary embodiment of the present invention will now be described. This section illustrates a system for receiving phone calls and dynamically matching the session with advertisements and information. The system receives phone calls, accepts user requests, and matches the user requests against one or more information sets. Thereafter, the system either provides the requests and session information to advertisers or compares that information to locally stored pre-specified advertiser preferences in order to yield an ad selection decision. Then the system provides the user with the information the user requested.

Embodiments of the present invention include methods and systems as described in co-pending and commonly assigned U.S. patent application Ser. No. 11/250,743, entitled, "Method and System for Providing Information and Advertising Content in a Telephone System," filed on Oct. 14, 2005, U.S. patent application Ser. No. 11/251,341, filed on Oct. 14, 2005, entitled "Method and System for Determining Gender and Targeting Advertising in a Telephone System," and U.S. patent application Ser. No. 11/250,914, entitled "Method and System for Integrating Information From Wireless and Landline Telephone Systems," which are incorporated herein by reference in their entirety for all purposes. Combinations of the techniques described in the above-referenced patent applications with the techniques described in the present specification are also included within the scope of embodiments of the present invention. One of ordinary skill in the art would recognize many variations, modifications, and alternatives.

In some embodiments of the present invention, the method takes the form of routing a call around the system and building up an accurate model of the call information, then presenting an appropriate advertisement to the user.

System Data Glossary

Generally the system tracks a number of data entities during its operation:

A Session is the context for a single call into the system, for the length of the call. When the caller hangs up, the Session is over.

The Session Model is the aggregation of everything that is known about the Session.

A User is an individual making a phone call. A User may make multiple calls. The system is based around sessions rather than users. The system, may, however, track user information across sessions to build up a more accurate Session Model for future calls.

Advertiser Preferences, or Rules are the mechanism by which advertisers specify how to match an Advertisement against a Session, based on the Session Model.

An Advertisement is a specific sound file or text file, combined with possible Affirmative Actions that a caller can take during or after the playing of the sound file. The sound file for an Advertisement is stored on the IVR for quick playback, while any Affirmative Actions a caller can take are stored in the InfoAd server.

Customer characteristics, whether known or inferred, include any variable(s) relevant to the caller, including but limited to those variables defining the demand determinants of the advertiser's target segment. For consumers, such variables include demographics (e.g. education, income, age, occupation, etc), geographic location, psychographics (e.g. activities, interests, opinions, etc) and buying behavior (e.g. product purchasing patterns, brand loyalty, etc). For business customers, demographics may include size of business or revenue, and buying behavior would refer to corporate level purchasing activities.

Other customer characteristics, whether known or inferred, could include one or more of the following: origination phone number determined by ANI, destination number, or DNIS, geographic location, predicted gender, predicted age, time of call, etc.

System Functional Components

Generally, the system has a number of logical components that act on the data entities in the system.

A Phone Switch receives calls from the Public Switched Telephone Network (PSTN), or a semantically equivalent analogue (e.g. a VoIP network—for consistency this network will be referred to as "PSTN" unless there is a meaningful technical distinction).

An Interactive Voice Response server (IVR), which handles automated interaction with users. The bulk of the IVR's work is broken down into two areas, which can be considered two logically separate components:

Information gathering (i.e. asking the user for information)

Advertisement handling: playing an advertisement and taking any user input which results and information delivery (e.g. providing the information the user originally called to inquire about).

One or more phone banks of Customer Service Representatives (CSRs) who handle interactions with users that require human involvement. The phone banks include computers that the CSRs use to manage their calls, including a customer service application served from the CSR Application Server, and a switch in contact with the InfoAd server. The InfoAd server may enable the CSR who receives a call to also view that callers' information on the screen.

The CSR Application Server provides a user interface to the InfoAd server for CSRs to use. CSRs using this application are given information from the InfoAd server which corresponds to the session currently being terminated at their phone. Embodiments of the present invention are designed to provide a web UI, but this could also become a "thick client" UI or other form of application/server layer model as performance and user interface requirements dictate.

The InfoAd server, which directs the call flow. The InfoAd server performs several functions:
Directing call flow
Collating session information from the network and the Session History Database
Using the session information, querying the local Advertiser Preferences DB and remote Advertiser Preferences Servers
Arbitrating between multiple possible matching advertisements
Directing the IVR to play a specific Advertisement, and to monitor for any Affirmative Actions.

The System State Database is a high speed data store used by the InfoAd server to keep track of current system state. For reasons of brevity this document does not generally refer to the System State Database, but the InfoAd server stores transient information lasting beyond the scope of a single call flow step in the System State Database.

Local Advertiser Preferences Databases. These contain advertising matching rules submitted by advertisers.

Remote Advertiser Preferences Servers. These serve a similar purpose to the local Advertiser Preferences Databases, but are maintained by advertisers on their premises, and in some embodiments are accessible via an XML-protocol network API.

The Advertisement Database is typically a logical construct—a set of aural\visual advertisement files stored on the IVR, and an index of Advertisements stored on the InfoAd server. This index matches Advertisement IDs with the aural\visual files stored on the IVR, and is referenced by the Advertiser Preferences databases when returning the Advertisement to play.

The Session History Database is a database that records past sessions and can be used to tie these to new calls. The results of a query of the Session History Database 708 are multifaceted as are the Supplemental Databases 700.

The Supplemental Information Database aggregates information from any third party databases that have been acquired to cross-index information on incoming sessions. The matching algorithm will typically involve an ANI match to the locally stored third party database. Various elements of information 704 can be contained in the Supplemental Information Database 700.

The Information Requested Database contains all the information that callers would be calling to request, and may aggregate data from multiple third parties or contain data developed internally.

This list provides an exemplary list of functional areas in a logical manner. However, each functional component is, or can be, multiple physical components in order to facilitate fault tolerance and scalability. The obvious case is the CSR phone bank, with multiple operators, but the InfoAd server is a cluster of servers that track requests through the system. The local databases and the phone switch are not typically scaled through pure horizontal clustering, but are generally clustered through their native mechanisms.

An exemplary embodiment provides for the following general components:

The switch speaking to the PSTN supports SS7 signaling or a protocol with equivalent semantics, and the ability to communicate ANI, ANI-II and DNIS information into the InfoAd server. Where the external network is not a traditional (i.e. "plain old telephone service" (POTS)) network, the switch would support semantically equivalent protocol functionality. In addition, the exemplary embodiment provides for a hot-failover capability.

An exemplary embodiment provides for the database server being ACID compliant. It is assumed that a standard SQL database is employed, but for performance reasons it may be desirable to use an object database instead as further described in the Performance section. Regardless of structure, the exemplary embodiment provides for the database server supporting hot-failover and/or clustering.

An exemplary embodiment provides for the InfoAd server being run as a commodity operating multitasking operating system with protected memory (e.g. Linux, Windows NT). Clustering is generally handled at the application layer.

An exemplary embodiment provides for the System Status DB being a fast in-memory database (IMDB) or object database (ODB) with hot failover.

An exemplary embodiment provides that components support TCP/IP networking.

Communication between each component of the system generally relies on a number of protocols. For simplicity reasons the InfoAd server is generally used as a central bus and usually only allows other components to connect directly when there is a direct requirement.

The switch and the IVR generally communicate via SS7 or equivalent protocol, and do not exchange application logic. The primary connection here is designed to deliver calls to the IVR and back.

The switch and the InfoAd server communicate via the switch's native control protocol.

Similarly, calls to the CSR phone bank are delivered over the phone network with no particular logic applied.

CSRs are using an application delivered via the CSR application server which is expected to be a web UI, but may be a "native" client or otherwise as needed. The CSR Application Server uses the native API of the System Status DB to view sessions.

The IVR and the InfoAd server communicate via the native protocol of the IVR hardware used.

The InfoAd server uses the native query protocol of the database servers it talks to (generally SQL over ODBC, JDBC, or via native C libraries).

The InfoAd server communicates to remote Advertiser Preferences Servers using InfoAds XML API.

The Network Layout 100 illustrates an example of how the components are laid out in a network according to one embodiment of the present invention.

Advertiser Inputs

Generally, several deliverables are provided by Advertisers:

Each advertiser typically provides the complete set of Advertisements, in the form of a sound\visual file (e.g., .wav, .mp3, or .aiff) and a description of any Affirmative Action results (e.g., a phone number to which a User's call will be directed if they press a button or speak during the length of the Advertisement).

Each advertiser typically either provides a list of Advertiser Preferences in the supported format (see below) or provides a server at their premises which supports the InfoAd XML API and is accessible via a VPN connection from the InfoAd Server's premises (PPTP, IPSEC, SSL or SSH tunnel).

Call Flow

The following call flow illustrates a typical call received by the directory assistance system in one embodiment of the present invention. A directory assistance system is typically a system in which individuals call a phone number and request certain types of information. The information requested generally involves a phone number, name of business, or address. Directory assistance services may also encompass enhanced information offerings such as stock quotes, movie listings, weather, directions, product or service reviews and the like.

Figure 2:
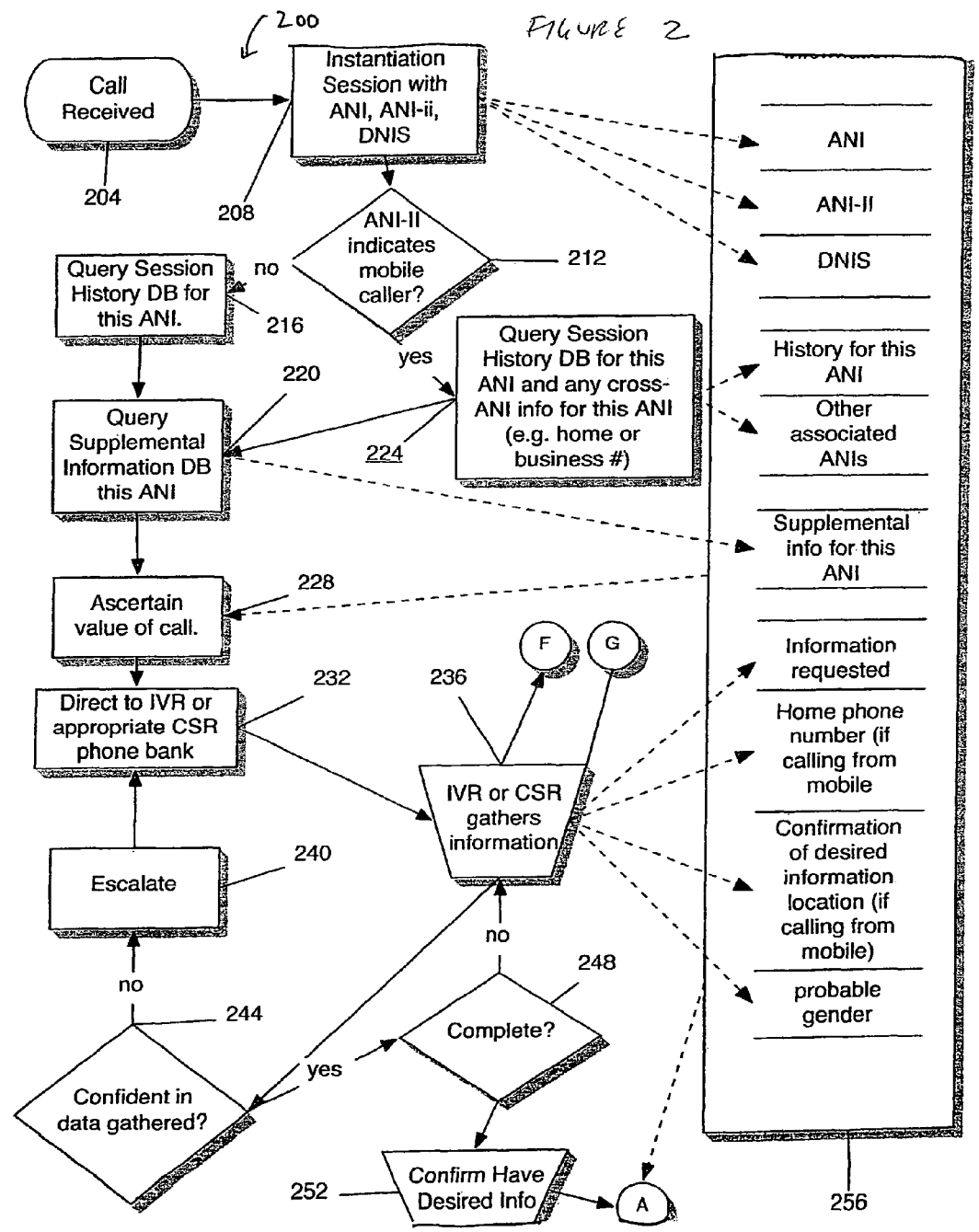
FIGS. 2 and 3 represent an example call flow according to an embodiment of the present invention.
Figure 3:
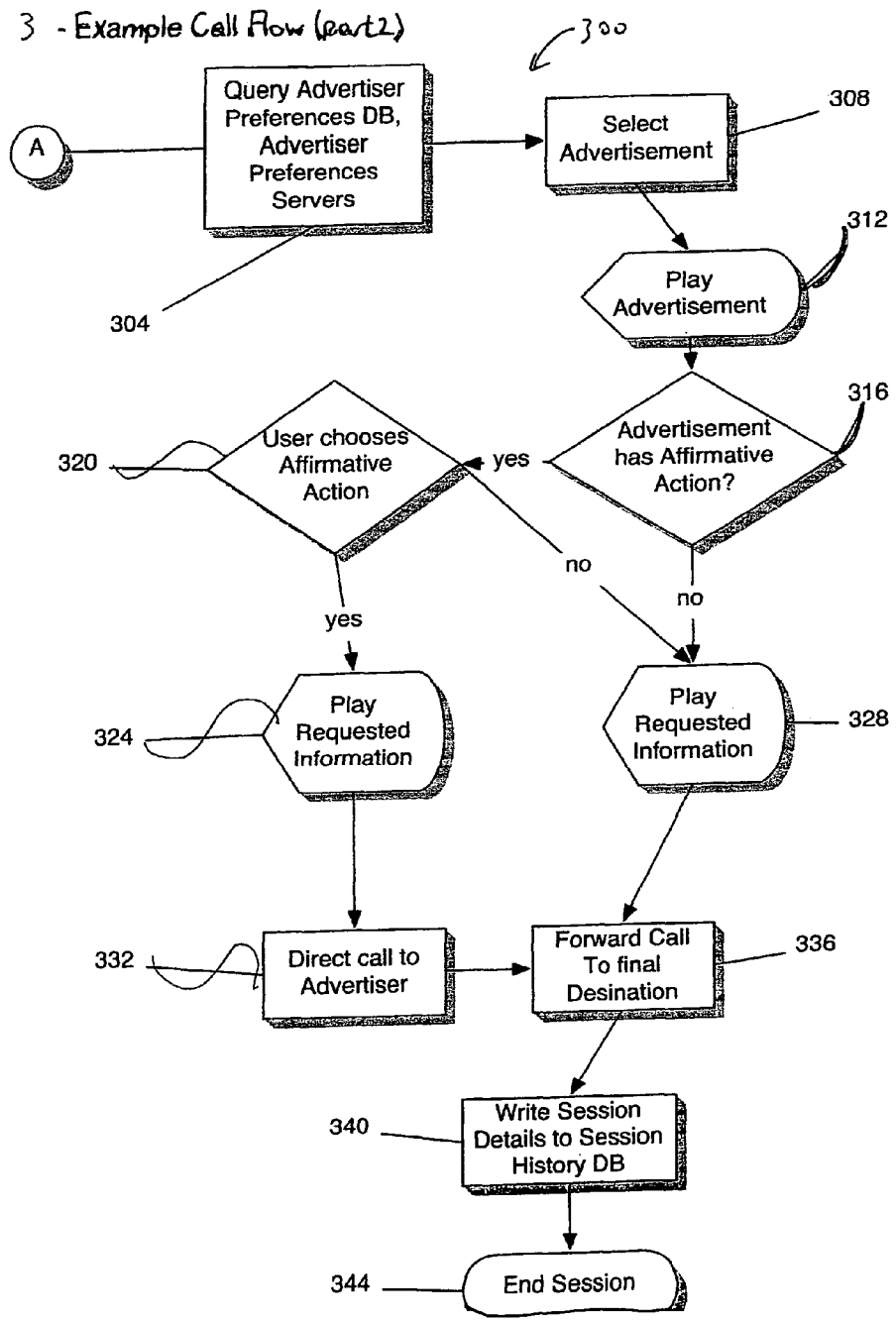
Figure 4:
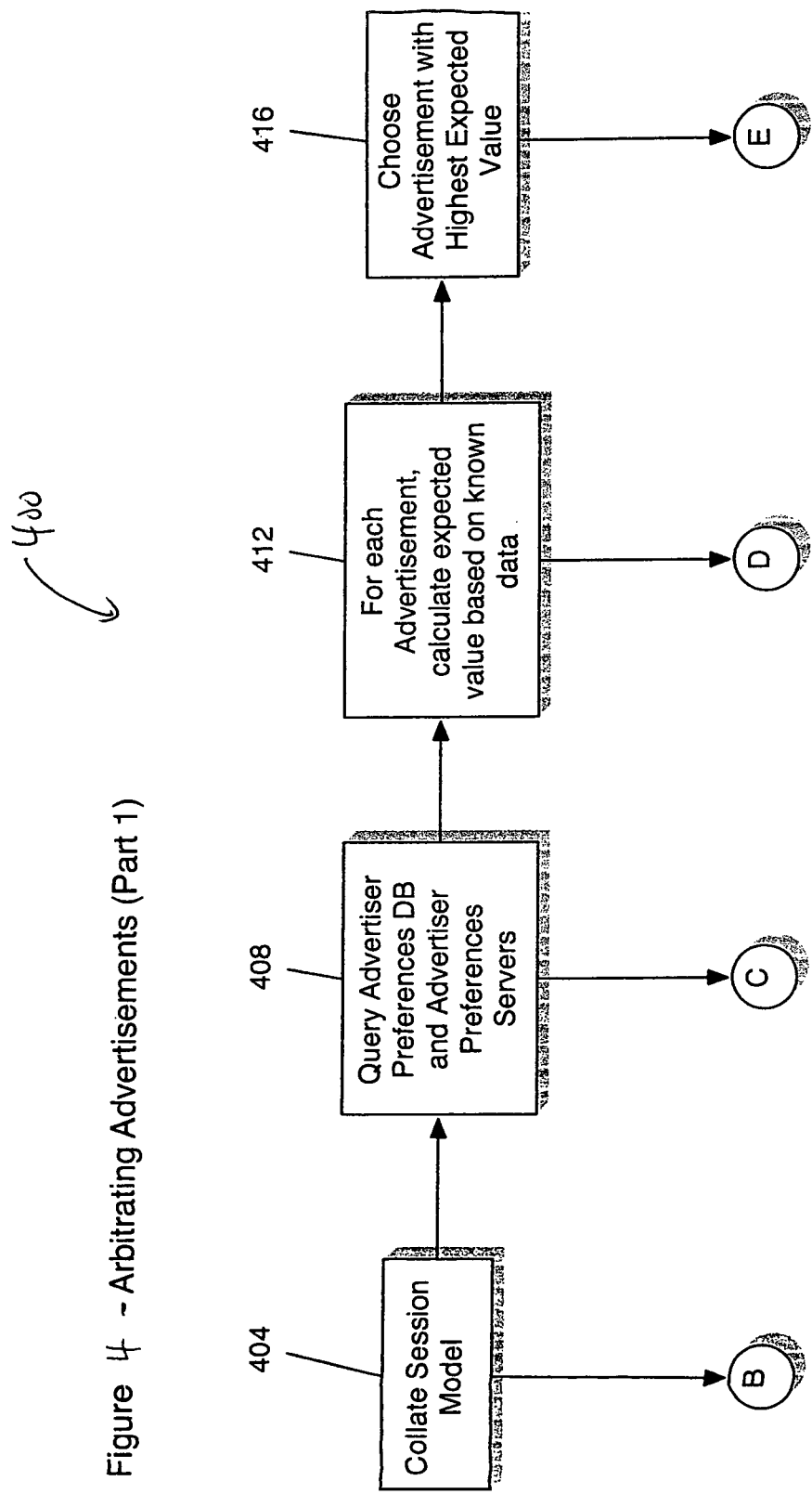
FIGS. 4-6 are simplified diagrams depicting a methodology for selecting which callers hear particular advertisement messages according to an embodiment of the present invention.
Figure 5:
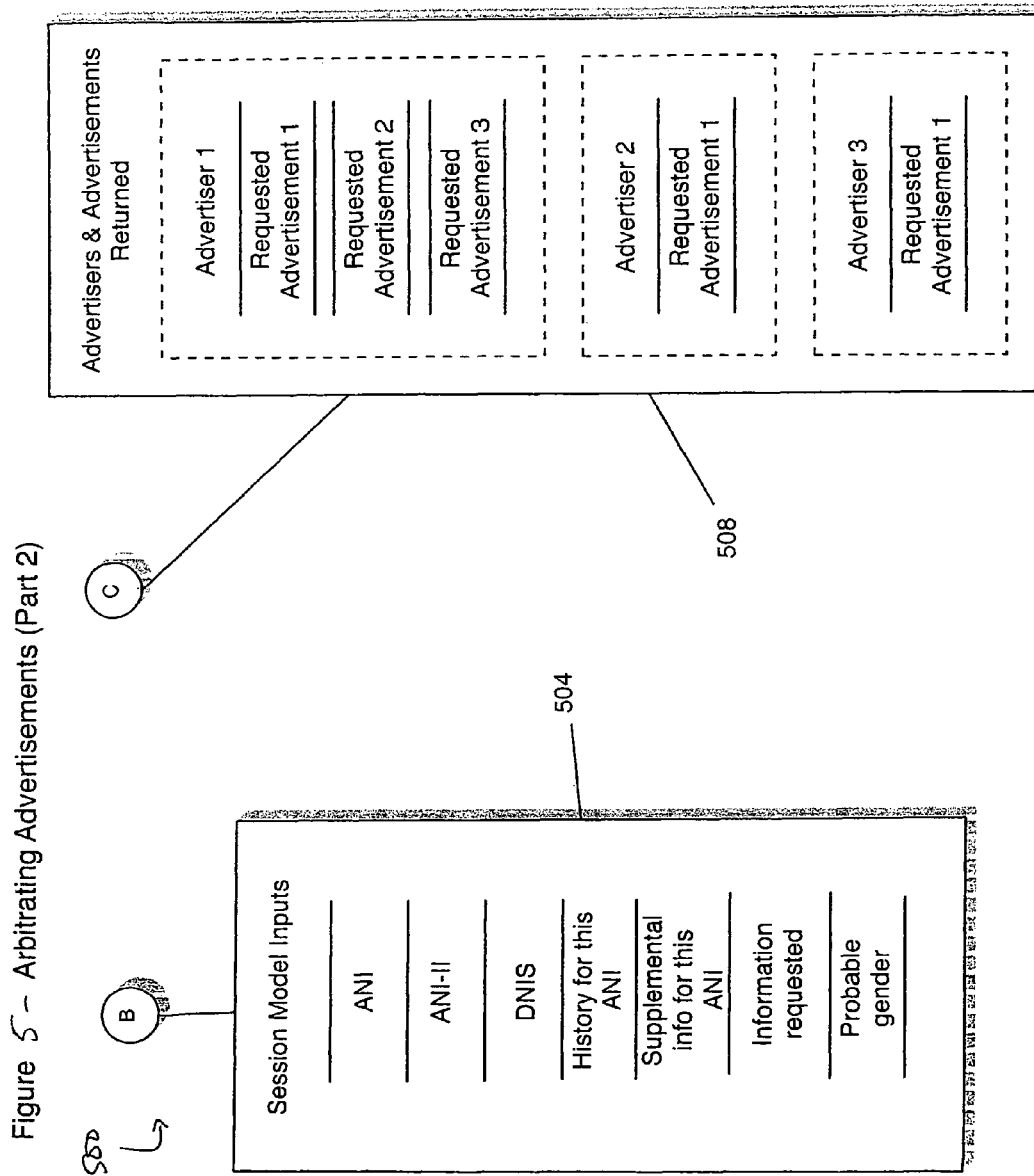
Figure 6:
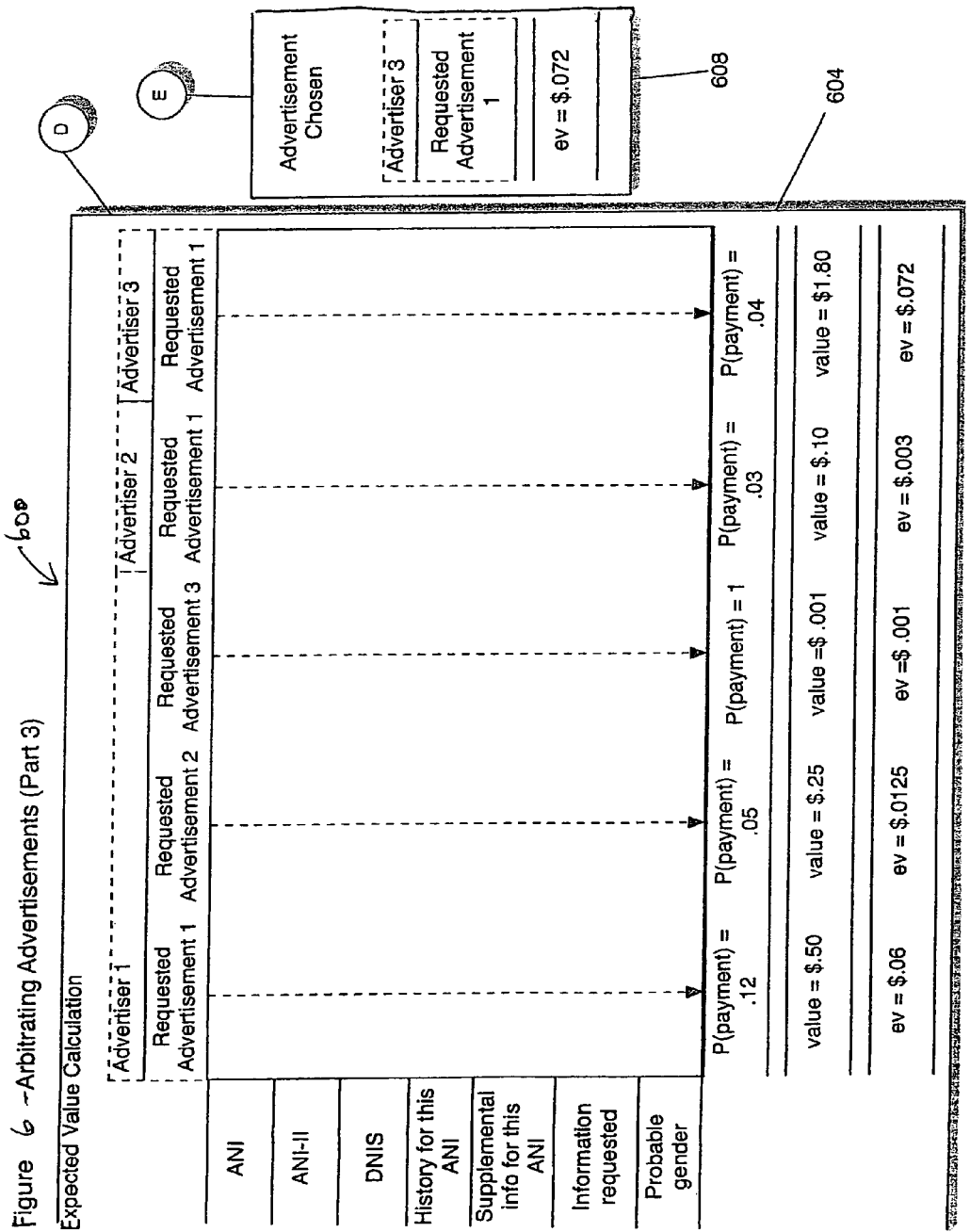
Figure 7:
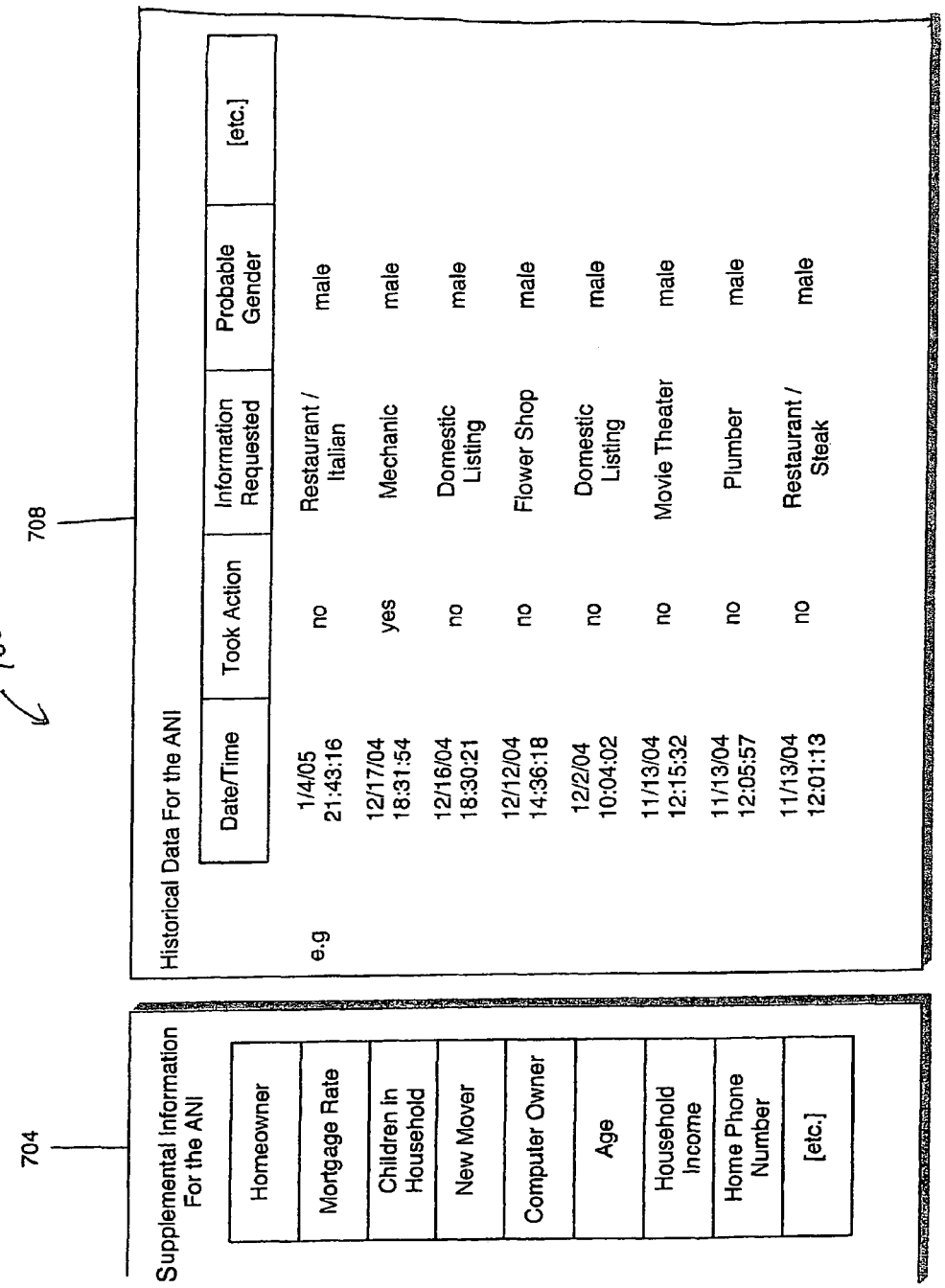
FIG. 7 is a simplified diagram representing a supplemental information database according to an embodiment of the present invention.
Figure 8:
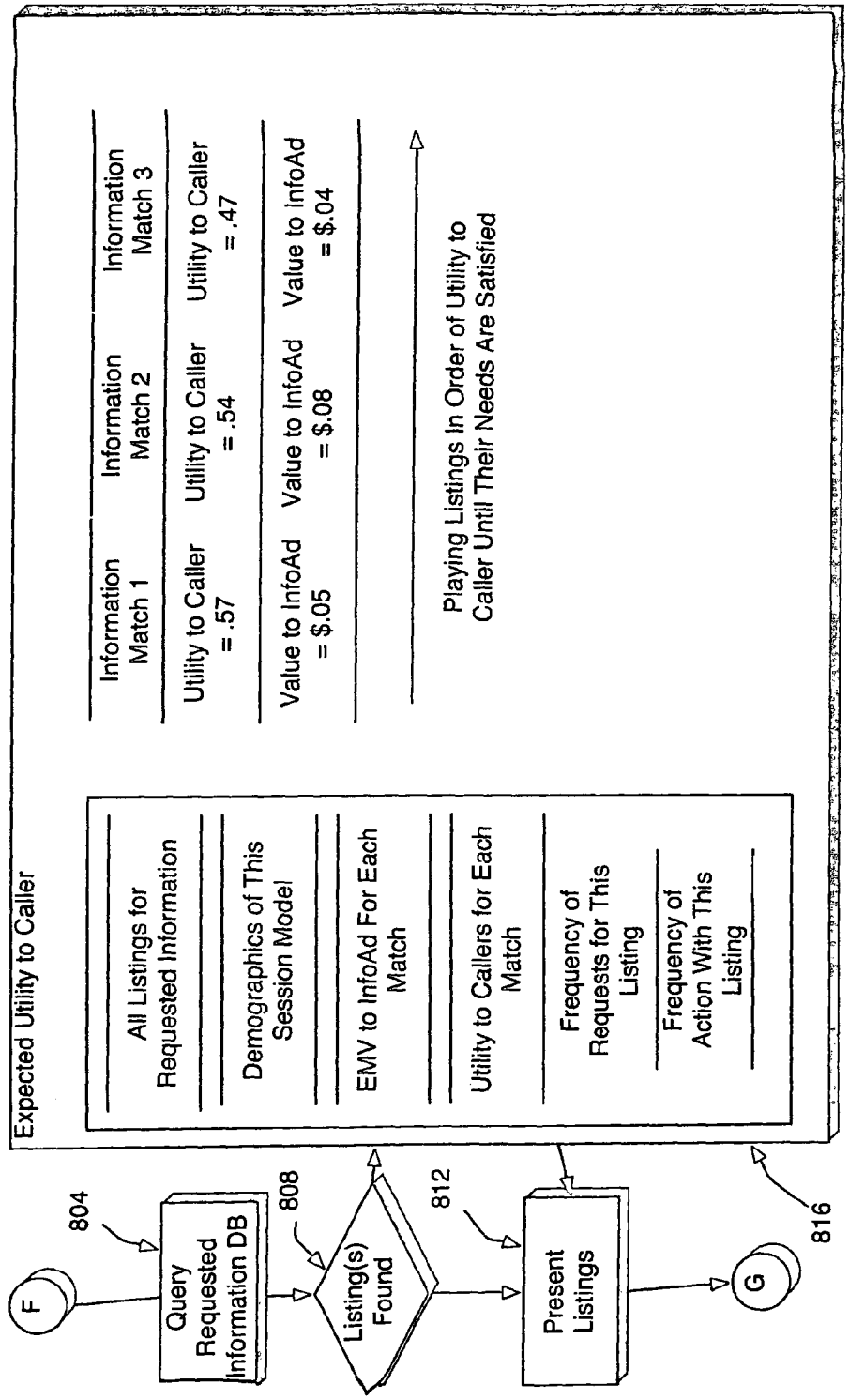
FIG. 8 is a simplified diagram depicting the methodology for ordering content for presentation to callers according to an embodiment of the present invention.

1. When a call comes in to the switch, the InfoAd server is notified of any ANI, ANI-II and DNIS information. For example, see items 204 and 208 in FIG. 2, "Example Call Flow (part 1)."

2. The InfoAd server instantiates the Session, adding the ANI, ANI-II and DNIS 208 to the Session Model 200.

3. The InfoAd server queries the Session History Database for any past usage associated with this ANI. If the ANI-II indicates that this call is coming from a mobile phone, the InfoAd server may also ask if we have any cross-ANI information associated (i.e. a home or business number associated with this mobile phone). This information 212, 216, 224 is added to the session model 200.

4. The InfoAd server queries the Supplemental Information Database for any additional information associated with this ANI. This information 220 is added to the session model 200.

5. The switch directs the call to the IVR or CSR phone bank for processing.

Generally this will have a default setting, and the InfoAd server will direct the switch to direct the call elsewhere if the default is not appropriate.

The IVR will typically be the default, with the CSR phone bank reserved for exception cases.

If the call is directed to the IVR, and at any point the IVR does not have a high confidence in its understanding of the User's requests, the call may be re-directed to a CSR phone bank for attention, or the audio clip involved may be directed to a CSR to analyze and react to without direct user contact. The decision regarding which phone bank to direct the call to is based on the expected value of the call 228, 232, 236 (e.g. expected low value calls could be directed to low level phone centers while higher value calls are handled by a higher level call centers; alternatively, expected low value calls could be directed to an IVR whereas higher value calls are handled by live operators). In this content, higher value calls could be handled more rapidly and benefit from shorter wait times. If necessary, calls may be escalated 244, 240 to higher-level phone banks until the issue is resolved. Likewise, decisions about how the queue of incoming calls is addressed can be made in the context of expected call value. More specifically, high value calls can be responded to sooner and low value calls placed in lower priority. Also, the number of times a speech recognition system attempts to discern the user's meaning (before escalation to a live agent) may be a function of the expected call value.

6. If the ANI-II indicates the call is coming from a mobile phone, the IVR or CSR phone bank may request the User to indicate their home phone number either in spoken or key-entry format. This information is added to the Session Model. Depending on the expectations of the market or the caller the InfoAd server may direct the IVR or CSR phone bank to offer an incentive for the home number.

7. If the ANI-II indicates the call is coming from a mobile phone, the IVR or CSR phone bank will confirm the location of the requested information from the server (i.e. if the call is coming from a 650 number but it is roaming, it is useful to ascertain whether the user actually wants information in the 412 area code) or by means of a geographic positioning system. This information is added to the Session Model.

8. The IVR or CSR phone bank (whichever was the destination in the previous step) asks the User what information is needed by the User and adds this to the Session Model.

9. The IVR or CSR phone bank attempts to ascertain the sex of the User. In the case of the IVR standard gender matching algorithms are employed. In the case of the CSR phone bank the CSR's assessment is utilized, and the CSR enters gender into the call screen. This information is added to the Session Model.

10. If the call is currently terminating at the CSR phone bank, the CSR application will notify the CSR if the system has the information that the User is looking for. At this point, the CSR can direct the system to proceed, and the call is directed back to the IVR. This positive feedback step allows the CSR to confirm that they have actually found the information 248, 252 before letting the user continue. If the call is not currently terminating at the CSR phone bank, the IVR proceeds.

11. The InfoAd Server uses the Session Model to construct a database query that is transmitted to the local Advertiser Preferences DB using the databases' native protocol (generally, SQL via ODBC, JDBC, or native C library calls), and/or remote Advertiser Preference Servers using the InfoAd XML API—as per the "Selecting Advertisements" section, below—and then transmits these queries 304. The Advertiser Preference components return a list of Advertisements to play. The InfoAd Server collates the responses from the Advertiser Preference components and then runs the arbitration algorithm to determine which of the returned Advertisements to play 308.

12. The InfoAd Server directs the IVR to play the selected Advertisement 312 and notify the IVR of any Affirmative Actions to monitor.

13. If the selected Advertisement offers an Affirmative Action 316 the User can take 320 (e.g. "press * to learn more about a special offer") the IVR will notify the InfoAd Server, and the InfoAd Server could direct the switch to forward the call to the Affirmative Action's destination phone number 336, effectively ending the call. Alternatively, the user may hear the selected advertisement, receive the requested information and only then have the option of choosing an affirmative action which might lead to hearing more pre-recorded information or a live transfer to an advertiser or other desired phone number.

14. The InfoAd server signals the IVR to play the information the User requested 328. If the User's request was for a directory listing, the User may be provided the option of being automatically forwarded to the requested phone number. If so, the InfoAd server will inform the IVR that this is an option.

15. The InfoAd Server queries the Information Requested Database regarding the caller's request for information, and uses the response to select which information to play for the caller, as per "Selecting Requested Information," contained herein.

16. The IVR plays the information the User requested 328.

17. If the User has the option to have the call forwarded, and takes that option, the IVR signals the InfoAd Server that this option has been taken. Otherwise, the call is ended.

18. If the User took the option of having his or her call forwarded, the InfoAd Server may re-examine the list of Advertisements returned by the Advertiser Preferences components and elect the IVR to play another advertisement before proceeding.

19. The InfoAd Server directs the switch to forward the call to its final destination 336.

20. The InfoAd Server commits any contents of statistical interest from the Session Model to the Session History DB, 340, and ends the session 344 once the caller has finally hung up.

If at any point during the call flow the call drops, or the user somehow ends the call, the component at which the call had been terminated notifies the InfoAd Server, which skips direct to the final session to log session data and end the session 200, 300.

Although the call flow illustrated above provides a number of steps, it is understood that additional steps may be added or illustrated steps may be subtracted within the scope of embodiments of the present invention. Thus, the call flow is not limited to the steps illustrated above. Moreover, the order in which various steps are performed is modified in some embodiments of the present invention. The call flow is merely provided by way of example and one of ordinary skill in the art would recognize many variations, modifications, and alternatives.

The Session Model

The Session Model may be considered as a running list of data attached to the call, which an Advertiser can use to match the call to an Advertisement. It includes, but is not limited to:

The phone number from which a call was placed (ANI), which represents a match in the case that an advertiser has pre-specified a phone number either in the Local Advertiser Preferences Database or Remote Advertiser Preferences Database.

The phone number to which a call was placed (DNIS), which can narrow the possibilities if the inbound numbers are differentiated but use the same server network to handle the calls.

Area code and exchange (NPA-Nxx, derived from the ANI information) in the case where a user cannot be specifically identified but advertisers are willing to rely on customer characteristics matching as an approximation.

Calling number information (ANI II digits, from Flex-ANI), to catch special cases related to location (e.g. calling from a pay phone) or other circumstances which may involve special handling (e.g. calling from a cell phone)

Probable gender or age (based on analysis of the caller's voice)

Additional manually entered information (e.g. the home phone number of the caller, requested to matched from records when the call is from a mobile phone; the zip code or locality in which the user is looking for information, and the information the user is looking for).

Historical data about that phone number (e.g. prior purchase history, past action rates, etc.) and recorded in the Session History Database.

Additional information we have about that phone number, acquired from third parties and generally stored in the Supplemental Information Database.

The Session Model object is the collection of information provided by advertisers either via the Advertiser Preferences Server or the Advertiser Preferences DB to determine what Advertisement to play.

The Session Model does not generally explicitly identify the caller, but typically provides meaningful information to support the predictive matching process. Advertisers can tailor their Rules to attempt to match specific people, specific customer characteristics, or simply people looking for specific types of information.

Selecting Advertisements

The choice of advertisements is generally determined by advertisers, using the Advertiser Preferences system. Advertisers determine their Preferences, and either submit them in a format the InfoAd system can use, or provide a server which answers queries with a list of Advertisements to play. In one sense, the InfoAd Server queries the Advertiser Preferences components, and these return lists which are then arbitrated. However, there are some technical distinctions between the local (Advertiser Preferences DB) and remote (Advertiser Preferences Server) components.

The Advertiser Preferences DB is a typically a local DB containing advertisements and key-value pairs of desired Session Model characteristics, and a list of rules for weighting Advertisements based on which Session Model characteristics were matched. The DB is queried via a standard DB query using the available key value pairs. For example, this pseudo-code illustrates a simple SQL query, and any additional information would be added to the query in the [ . . . ] area.

SELECT advertisement.id, advertisement.action, advertisement.matchtype WHERE advertisement.id=qualities.adid AND (qualities.phone='$ANI' OR qualities.dnis='$DNIS' OR qualities.probsex='$PROBABLESEX' OR qualities.probsexprob='$PROBSEXODDS' OR qualities.inforequesttype='$DIRECTORYCATEGORY' OR [ . . . ]);

SELECT advertiser.rules WHERE advertiser.id=advertisement.advertiserid ORDER BY priority;

The first query will return a list of advertisements that match the Session Model, no matter how general. The second query will return a set of Rules which are used to sort the results of the first query. In the initial implementation, the Rules are returned as an ordered list (ordered by priority) of fields and field combinations, e.g. ("ANI", "NPANXX and INFOREQUESTTYPE"). For each advertiser, this list is traversed, and the first Advertisement matches a field is selected. For example, in the case above, if there existed an Advertisement which matched by ANI, that Advertisement would be selected. If there were no advertisement that matched by ANI, but one matching both NPANXX and INFOREQUESTTYPE, that Advertisement would be selected. If neither, nothing would be selected.

For the remote case, a direct database query is generally not used. Instead, the Session Model data is typically placed in an XML formatted API request delivered via an HTTP request to the Advertiser Preferences Server. The Remote Advertiser Preferences Server returns the list of Advertisements and the list of Rules in XML formatted documents.

Because Advertisers maintain their own Advertiser Preferences Server, the internal structure of their database is generally not of concern so long as its responses comply with the InfoAd XML API.

Presumably, a primary demand for the system from advertisers will be based on the Advertisers providing ANIs directly. In the case that the Advertiser is providing the data to use in the Advertiser Preferences DB, the search would be the same as other searches. For example, if a call came from a male, looking for an Italian restaurant, calling from 650-555-1234, the query to the database would look like:

SELECT advertisement.id, advertisement.action WHERE advertisement.id=qualities.adid AND (qualities.phone='6505551234' OR qualities.probsex='M' OR
qualities.inforequesttype='Restaurants/Italian');

The Advertisers wanting to match ANI would have provided a qualities table with approximately this format:

| phone | adid |
|-------|------|
| 6505551234 | 3546 |
| 4085551876 | 3547 |
| [etc.] | [etc.] |

In addition, the advertiser would have included rows in the advertisement table with approximately this format:

| id | action | matches |
|----|--------|---------|
| 3546 | NULL | ANI |
| 3546 | NULL | NPANXX and INFOREQUESTTYPE |

Last, because the Advertiser was primarily interested in ANI matches, its Advertiser rules would have approximately this format:

| priority | rule |
|----------|------|
| 1 | ANI |
| 2 | NPANXX and INFOREQUESTTYPE |

The initial query would match adid 3546, which matches for "ANI" and for "NPANXX and INFOREQUESTTYPE". The rules query indicates that the advertiser first prefers ANI matches, and since adid 3546 has an ANI match, the ad is matched and the match is complete for that advertiser.

If the Advertiser were using an Advertiser Preferences Server instead of providing information for the Advertiser Preferences DB, the above complexity would be removed—the Session Model would be passed to the advertiser and receive back an advertisement to play, and there would be no visibility into what decision process was used by the Advertiser.

In other cases, Advertisers may provide general rules involving targeted customer characteristics. For these situations, the Supplemental Information Database will be used. As described above, the Supplemental Information Database consists of information provided by third party data aggregators. Typically, each individual record will contain a phone number field. The exemplary embodiment provides for the matching of the ANI with the record containing that phone number to make a probabilistic determination of the callers' relevant characteristics. As with other cases, the determination is handled by querying the advertiser preferences database using a query constructed from the session model. For example, the query would approximate:

SELECT advertisement.id, advertisement.action WHERE
advertisement.id=qualities.adid AND
(qualities.phone='6505551234' OR
qualities.education='somecollege');

In still other cases, Advertisers using the Advertising Preferences DB may provide very loose rules or provide Advertisements that match all calls (e.g. "play this for everyone"). These situations will likely result in the Advertisement entering the arbitration process against other Advertisements. In some embodiments of the present invention, these kinds of advertisements are less likely to be broadcast because they have low historical relevance to imprecisely targeted users. However, the system does not specify the behavior, it only predicts what will happen given the system's general matching process.

Because many Sessions will result in Advertisers requesting multiple possible Advertisements, and multiple Advertisers requesting Advertisements, the system provides for arbitration between the options and chooses a single Advertisement to play. In the simple case it does this using a simple Expected Value Calculation:

$$EV = P(\text{paid for this ad}) \cdot V$$

EV is the expected value of the advertisement
P (paid for this ad) is the odds of getting paid for this ad
V is the value of a payout for the ad
For example, one ad pays $0.10 every time it's played—EV is $0.10. A second ad only pays when the user takes the Affirmative Action, and it pays $2 for the Affirmative Action, and this Session Model estimates a 10% chance that the user will take the action—EV is 0.1·$2.00=$0.20 If comparing the above two ads, the second ad would be selected.
In general a P value is used based on previously observed ad-click-through behavior associated with the caller/origination phone number, statistical inferences regarding click through behavior drawn from the caller's predicted cohort group, and what information the user is looking for. The caller is identified to the best precision possible using the Session History Database, and various elements are matched based on existing results of data mining the Session History Database (see below).
In the case where there is no P value for a given advertisement, the system will substitute the historic average for cases where there is not sufficient information.

Over time, data mining of the Session History Database will allow a weighting of the P values of the arbitration algorithm. The database will be mined to identify relevant customer segments and any correlation between different customer characteristics and success ratios for different advertisements; this may consist of using basic $\chi^2$ and linear regression tests, or other tests as appropriate. While the algorithms for this are known and simple, the proper analysis may be fairly time consuming and processor intensive. Therefore, the expectation is these processes will be done off-line and then the information will be used to inform the InfoAd server's real-time decision making. Ultimately, these steps enable the choosing of an Advertisement 400, 500, 600. The mining of the Session History Database will also enable the implementation of anti-fraud measures. Repeated calls from particular ANIs, repeated requests for particular listings, or repeated affirmative actions from certain ANIs within a certain period of time, for example, may: (1) alert the system that additional calls from such ANI are to be temporarily blocked, (2) alert the system that certain ads are not to be presented, (3) alert the system that certain affirmative actions such as connecting to an advertiser or requesting a call back are to be temporarily disabled, (4) alert the system that requests for particular listings or affirmative actions are to be effected but not tracked and not counted for purposes of gauging user preference.

As noted above, directory assistance charges have rapidly escalated in recent years with telephone companies increasing their rates. In response, the last two years have witnessed the birth of several directory assistance services that relay advertising messages to callers. As such, the use of free directory assistance has already been implemented, with advertisers providing the revenue to support such service.

From its cache of ads, the provider of free advertiser supported directory assistance services today selects the advertisement that is played to the caller. The matching processes either do not attempt to tailor the ad to the caller or attempt to do so by using crude demographic proxies such as area code or prefix. Moreover, today's information and advertising systems do not directly access the advertiser's own researched data base listing of past/current/prospective customers nor do these systems seek to match ad content to the caller's own/predicted characteristics. Each advertiser's specification of and combination of the identifiers comprising customer profile is unique to the particular product or service offered and its marketing mix. Therefore, selection criteria based on broad based categories ensure, at best, generalized rather than specificity of targeting. Thus, where such categories are used, there is considerable inefficiency and detriment to both caller and advertiser.

Today's providers of free advertiser supported directory assistance service have sought to mimic the Internet search model wherein the caller's search category (i.e. the type of product or service requested) determine the ad(s) to be delivered. Such selection methodology could be efficacious in furnishing information at an opportune moment, when the caller is in a search mode. However, advertisements of products or services chosen simply on the basis of search queries are by their very nature not as finely tuned to meet individual caller needs as are advertisements that are targeted to the caller's predicted characteristics or that match both the caller's search needs and the caller's predicted characteristics to the advertiser's offering.

Meanwhile, today's offerings face a dilemma regarding how to present the listings in a given business category. Up until recent times, carriers did not offer business category search at all. Directory assistance callers generally needed to know the "exact name and spelling" of the listing. Callers who did not know the precise spelling could still make a request by name and the operator would assist the caller in trying to determine the spelling. Regardless, all such offerings required the caller at least know the name of the business. Meanwhile, even today many carriers do not offer business category style search. And the carriers who do offer business category search face a dilemma on how to present the series of business listings. Unlike other media, the telephone is an awkward media for the presentation of multiple elements of information. Callers can typically hear one element of information at a time. Therefore, the ordering of information takes on a high level of importance.

The current solutions solve the problem of business category ordering by listing businesses according to advertiser value, in the case of advertiser supported systems, or randomly or alphabetically as in the case of fee based services offering business category search. Solutions that use advertiser value list paying advertisers first. Companies that have declined to advertise with the provider are put at the end. A further ordering by randomization or alphabetical nature can be used to sort within the three buckets.

The first method—listing in accordance with advertiser willingness to pay—is beneficial for advertisers. However, such an approach does not meet caller needs. In many cases, callers doing a business category search will be short on time. Wading through multiple listings ranked by commercial value is inefficient to the extent that such callers do not perceive these listings to be the most useful. For this group of users, the current method is not optimal.

The second method—listing randomly or alphabetically—also fails to meet the needs of many callers. Unless callers are fairly indifferent to the options presented and/or have no time constraints, such a solution is not optimal.

From a market perspective, advertisers face a very real need to increase their effectiveness by amalgamating the telephone medium (e.g. free directory assistance) with the data bases arduously identified, generated and maintained internally or by third party market data providers. Such a solution would ensure greater productivity of marketing expenditures than is presently being achieved. Consequently, the one-to-one direct marketing by way of a new system offering free information services would culminate in a mutually beneficial outcome for both advertiser and the customer.

From an operation perspective, today's directory assistance systems still largely utilize methodologies developed for a non-competitive monopoly service. However, the provider of services envisioned herein must, by necessity, utilize all the available caller information to optimize efficiency and productivity. Consequently, the scope for innovation in the call-flow process is great and thus the improvements described herein will contribute to substantially enhanced optimization.

Selecting Requested Information

The InfoAd system can be deployed to answer a number of different types of information requests. One possible application relates to the directory assistance application, where callers are using the service to find phone number and address information for a person, business, or type of business. The InfoAd system can select appropriate information for the caller based on a number of methods appropriate to the information requested and the nature of the application.

In situations where the requested information is specific and unique (e.g. in the directory assistance example, a request for the phone number of a specific person or business), the InfoAd system will provide that specific information.

In situations where the requested information is more general, and provides for a set of possible responses (e.g., a directory assistance search for businesses in a type of business such as "florist" or "pizza"), the InfoAd system generally decides which information bits to provide and what order to provide them in. In some embodiments, the system will present a number of options to the caller. At any given moment the caller may indicate that their needs have been satisfied 800 by taking an affirmative action such as requesting a call forward to the advertiser, requesting a call-back or requesting more information.

The InfoAd system can determine this ranking using the expected monetary value to the system's operators, expected utility to the present caller, or a combination of both. The overall method for choosing the listing to play is:

1. Determine the total set of matches for the caller's information.
2. Determine the expected monetary value to InfoAd for the listings in the set of matches.
3. Determine the probable utility to the caller for the listings in the set of matches.
4. Based on the present ranking weights, choose the most appropriate listing to play for the caller and play it.
5. If the caller still needs listings, continue choosing the most appropriate remaining listing and Expected monetary value to the system operator is determined in a manner similar to the choice of Advertisement-based on demographic analysis of the Session Model and the value of the listing. For example, in a directory assistance application, if businesses have paid for preferential listings, expected value to the operators would be the amount the business is paying to have their advertisement played.

Expected utility to the caller is more complex, may be difficult to assign a monetary value to, and involves a number of different heuristic judgments. The overarching goal is to provide the listing that most answers the caller's question in the most satisfactory manner. This invention solves these problems through a multi-faceted approach. A number of criteria are proposed herein to rank the candidate information listings in order to ascertain caller utility and thereby determine the order of presentation 800. For example, in the directory assistance case:

The frequency with which all previous callers have requested a specific listing;

The frequency with which all previous callers whose profiles approximate this Session Model have asked for a specific business in the business category that the present caller is requesting;

The frequency with which all previous callers have heard a listing and have then taken action indicating that they found the listing relevant (e.g. hung up after the listing has completed, requested that the listing be repeated, requested that the call be forwarded to the number of the listing, or requested to take an Affirmative Action in the case that a listing is that of an InfoAd Advertiser). Tracking the activities associated with the affirmative actions enables the system to calculate a response rate and associate that response rate with a given business.

The frequency with which all previous callers whose profiles approximate this Session Model have heard a listing and have then taken action indicating that they found the listing relevant (e.g. hung up after the listing has completed, requested that the listing be repeated, requested that the call be forwarded to the number of the listing, or requested to take an Affirmative Action in the case that a listing is that of an InfoAd Advertiser). Tracking the activities associated with the affirmative actions enables the system to calculate a response rate and associate that response rate with a given business for a given subset of callers selected from the group of all callers.

In the case of listings and business categories for which the system does not have enough historical data to make an informed decision, the system can use a general historical average to provide a starting point, and then adjust the weighting for future calls.

Other statistical patterns which may apply in specific cases.

Any of the above ideas can be implemented in isolation or in any number of combinations. For example, the system could only track the frequency of requests for specific businesses across all users or the system could track frequency of requests for specific businesses according to caller geography and do the same for business category requests.

The exact weighting of criteria 816 will depend on the application and the Session Model, and the ranking weights and algorithms may change over time based on user experience and business requirements.

The InfoAd system, like all phone information systems, and unlike most information systems (e.g. web applications) does not have the ability to present multiple information search results simultaneously for comparison. Accordingly, the emphasis in the algorithm is in choosing the best available candidate at the moment, presenting it to the caller, then repeating the process until the caller is satisfied.

Figure 9:
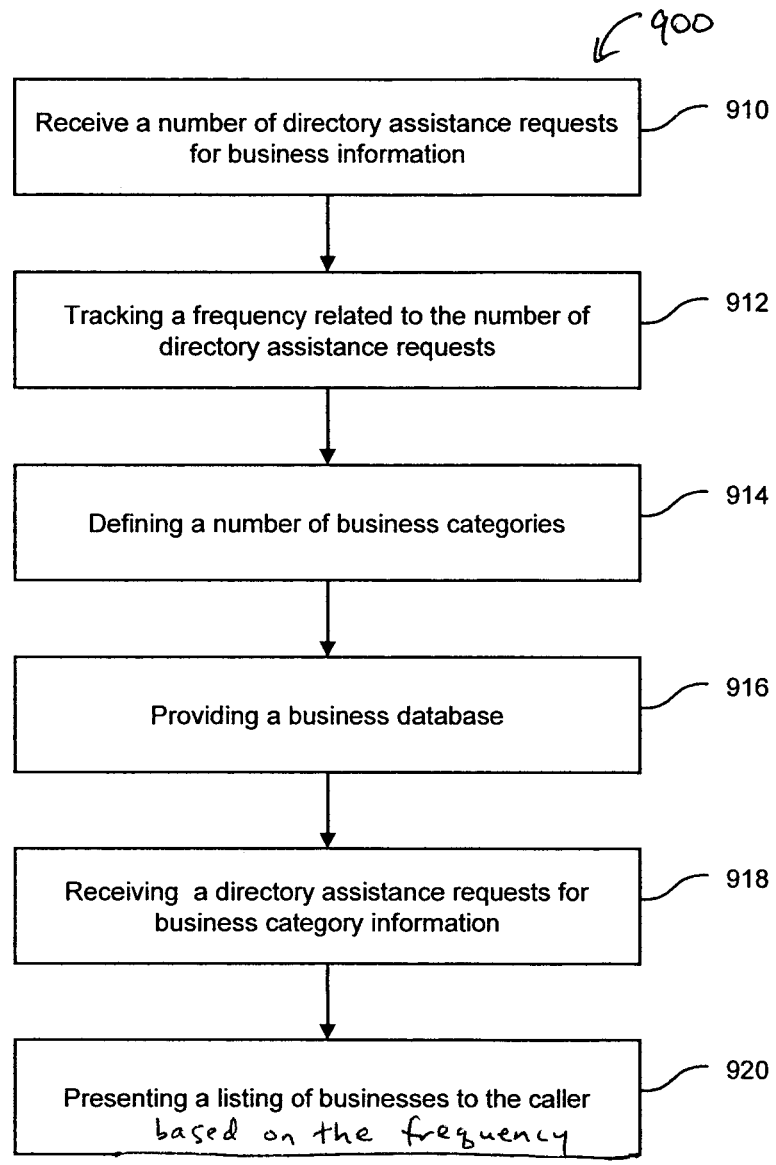
FIG. 9 is a simplified flow chart illustrating another methodology of providing content to callers according to an embodiment of the present invention.

FIG. 9 is a simplified flow chart illustrating a method of providing content to callers according to an embodiment of the present invention. Step 910 illustrates the system receiving a number of directory assistance requests for business information. The information could include, but is not limited to an address, a phone number, a product review, or a service review about a business. The following table depicts one example of such a table with some variables shown:

| Name | Category | Phone number | Address | City |
|---|---|---|---|---|
| Round Table | Pizza | 650-723-2300 | 1234 Walnut Drive | Menlo Park |
| Dominos | Pizza | 650-725-8900 | 5678 Brickton Lane | Menlo Park |

Step 912 shows the system tracking a frequency related to the number of directory assistance requests. For example, if the Dominos Pizza in Menlo Park has been requested five hundred times, the system keeps track of each request and the aggregate number of requests. Additionally, the system may note characteristics associated with the callers. For example, the system may track the fact that three hundred of the five hundred requests came from callers with Bay Area phone numbers. Additionally, some callers will call from cell phones with non Bay Area area codes, but the system may have identified that these callers have households within the geographical limits of the Bay Area. Step 914 involves the defining a number of business categories. For example, one business category would be pizza. Another would be florist. Yet a third would be automotive repair. Within each category would be a listing of businesses. Step 916 therefore involves providing a business database. This database would have individual businesses associated with each category. Further associated with each business would be information such as a phone number, address and the like.

Step 918 illustrates receiving a directory assistance requests for business category information. For example, a caller would call saying, "Please give me a pizza listing in Menlo Park."

Another caller might request, "I need a florist in Palo Alto". Step 920 entails the presentation of a listing of businesses to the caller wherein the order in which these businesses are presented is a function of the frequency with which they were requested in the directory assistance requests for business information (step 910).

Also, before the listings are presented, some embodiments provide for a paid advertisement to be presented to the caller.

According to one embodiment of the present invention, the parameter for expected utility 800 to advertiser will be set to zero. In that case, the sole criteria for the ordering of the presentation of the information will be in accordance with the expected utility 800 to the caller as inferred by frequency of requests for the listing. And again, the frequency can be in the aggregate or with respect to certain characteristics such as geographic, demographic or psychographic. An example of geographic would be the following: over a certain time frame, the system logs five hundred requests for the Dominos Pizza in Menlo Park, three hundred requests for the California Pizza Kitchen in Menlo Park and seventy five requests for Joe's Pizza. In one embodiment, callers requesting the business category of pizza in Menlo Park would first hear a pizza ad from a sponsor and then could elect to hear the other options. Assuming there were only three pizza establishments in Menlo Park, the order presented would be Dominos, California Pizza Kitchen and then Joe's. In another embodiment, the system would modify the order based on where the requests originated. Using the above example, of the five hundred requests for Domino's, two hundred fifty came from outside the Bay Area. Of the three hundred requests for the California Pizza Kitchen in Menlo Park, twenty came from outside the Bay Area. Of the seventy five requests for Joe's Pizza, none came from outside the Bay Area. Therefore, the number of requests within the Bay Area would be two hundred fifty requests for the Dominos Pizza in Menlo Park, two hundred eighty requests for the California Pizza Kitchen in Menlo Park and seventy five requests for Joe's Pizza. Therefore, the order presented would be California Pizza, Dominos and then Joe's.

In other embodiments, frequency of previous requests is not the sole criterion for ordering. The system can also take into account payments from advertisers. For example, if two pizza establishments in Menlo Park each had five hundred requests, but one establishment offered a payment for priority, that establishment would be listed before the other.

In some embodiments, the presentation of the listings of businesses can be performed aurally. For example, callers hear the presentation of businesses over the phone either through an automated attendant or a live operator. In other embodiments, the presentation of listings is accomplished visually. For example, the caller may see the listing textually displayed on their cell phone, computer or personal communication device. Effecting such a display could involve the transmission of the information via commonly accepted protocols such as email or SMS.

In some embodiments, the frequency is adjusted to account for the number of requests originating from a particular phone number during a period of time. For example, repeated calls from one particular phone number may indicate that a caller is trying to manipulate the ranking system. As previously described, various anti-fraud measures may be provided to ensure that the metrics for approximating user utility are not compromised. Repeated calls from one ANI, repeated requests for a particular listing, or repeated affirmative actions from certain ANIs within a certain period of time, for example, may: (1) alert the system that additional calls from such ANI are to be temporarily blocked, (2) alert the system that certain ads are not to be presented, (3) alert the system that certain affirmative actions such as connecting to an advertiser or requesting a call back are to be temporarily disabled, (4) alert the system that requests for particular listings or affirmative actions are to be effected but not tracked and not counted for purposes of gauging user preference. Such measures will help ensure that the tracking of user behavioral patterns more truly reflects genuine user preferences.

Figure 10:
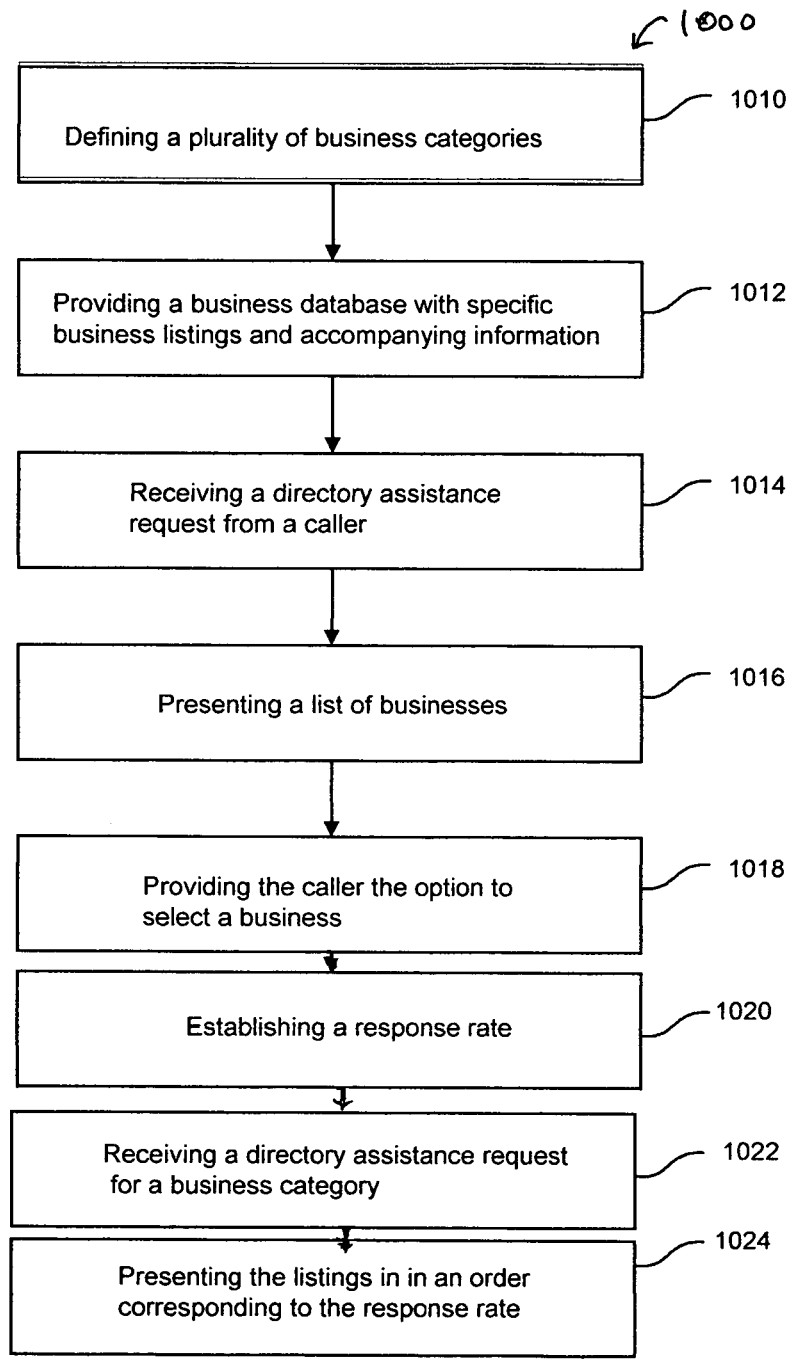
FIG. 10 is a simplified flow chart illustrating a methodology of providing content to callers according to an embodiment of the present invention.

FIG. 10 is a simplified flow chart illustrating a method of providing content callers will receive according to an embodiment of the present invention. Step 1010 involves defining a plurality of business categories (e.g., pizza, florist, etc). Step 1012 involves providing a business database in which each category has specific business listings and accompanying information about those businesses. In step 1014, the system receives a directory assistance request from a caller. In that request, the caller makes a request by category rather than by specific name of business. In step 1016, the caller is presented with a list of businesses that fall within the category. The presentation of these businesses can be done either visually or aurally. The caller has the option to select a business. Selecting the business may entail an automatic call forward to the business, a request for more information about the business, a request for a call-back or some other related action. In step 1020, the system establishes a response rate. For example, the category is pizza in Menlo Park and there are 5 pizza businesses in that category. 100 callers have made this request of which 60 selected the third pizza establishment for an automatic connection. Thirty of the remaining callers selected the fourth pizza establishment and the other 10 callers selected no establishment. The response rate corresponding to these businesses would be 0,0,60,30,0. In step 1022, a directory assistance request is received for a business category. In step 1024, the listings in that category are presented in an order corresponding to the response rate.

Also, before the listings are presented, some embodiments provide for a paid advertisement to be presented to the caller. In some embodiments of the present invention, the presentation is also a function of payments offered by one or more businesses in the category. The presentation order may also be based on a characteristic associated with a subset of callers. For example, the immediate caller may be calling from a phone number associated with a high-income household. The aggregate response rate cited in the example above was 0,0,60,30,0. However, the response rate among the high income cohort of previous callers may have been 0,0,10,20,0. In that case, the fourth pizza location may be prioritized ahead of the third pizza location. The characteristic need not be limited to income but may be any of a variety of demographic, geographic and psychographic characteristics. Additionally, the presentation of businesses may be performed either visually or aurally and the frequency may be adjusted to account for a number of responses is originating from a particular phone number during a period of time.

Figure 11:
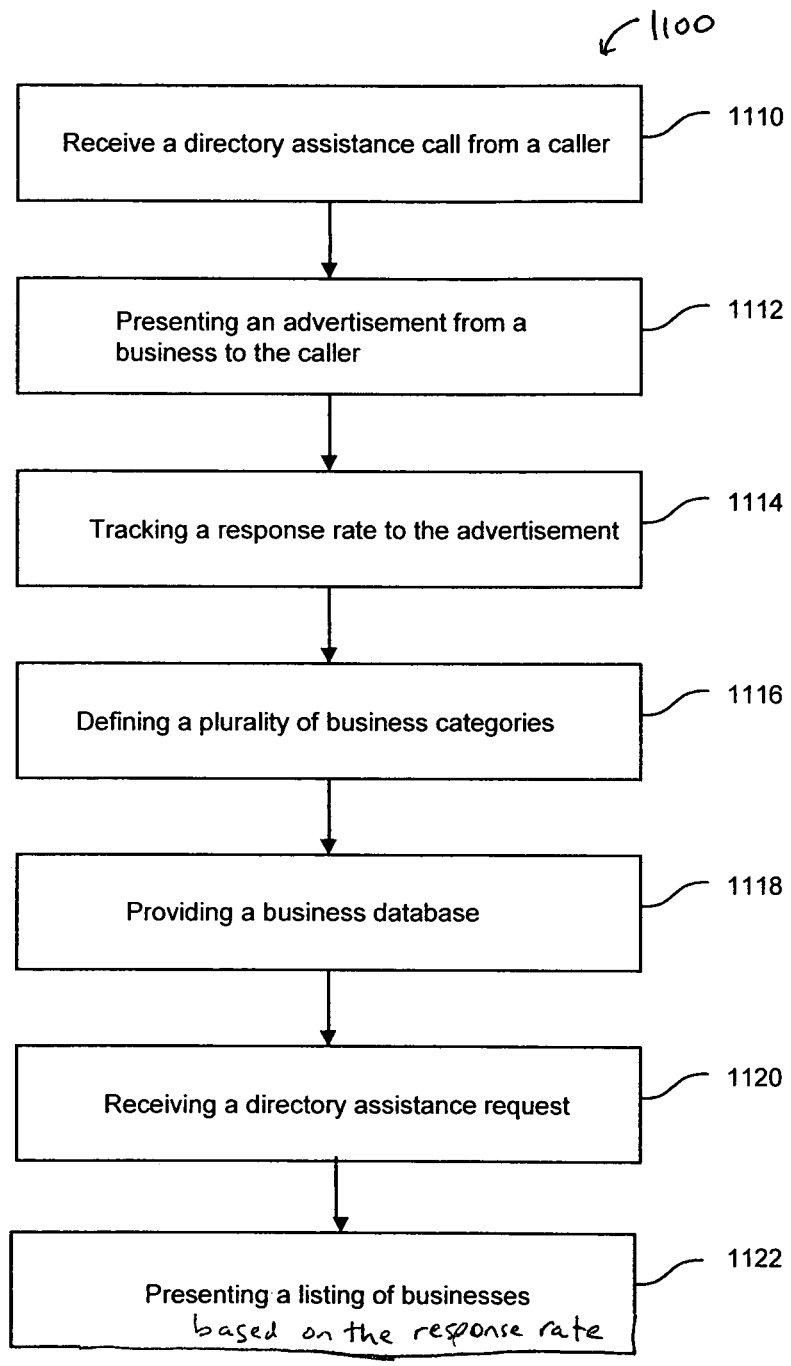
FIG. 11 is a simplified flow chart illustrating a methodology of providing content to callers according to an embodiment of the present invention.

FIG. 11 is a simplified flow chart illustrating a method of providing content callers will receive according to an embodiment of the present invention. Step 1110 involves receiving a directory assistance call from a caller requesting information. The information requested can be a name, address, a phone number, a product review or service review of a business or other element of information. Step 1112 involves presenting an advertisement from the business to the caller. That advertisement may be presented either visually or aurally. In Step 1114, a response rate to that advertisement is tracked. Possible responses include requests for more information from the advertiser, an automatic call forward to that advertiser, or a request for a call back from the advertiser. For example, one thousand callers might hear a 10 second advertisement for Dominos Pizza. The advertisement invites callers to "press star" to be connected to a Dominos pizza. If fifty callers press star, that would constitute a five percent response rate which the system would track. In Step 1116, a plurality of business categories is defined and in Step 1118, a business database is provided which has listings of individual businesses associated with the one or more business categories. In step 1120, a directory assistance request for a business category is received. For example, a caller calls asking for a pizza restaurant in Menlo Park. In Step 1122, the caller is presented with the list of businesses wherein the order of presentation is based on the response rate to the advertisement. For example, the system has scored Dominoes Pizza as having a five percent response rate. It may be the case that Pizza Hut also provided an advertisement which had an eight percent response rate. In presenting the pizza listings for Menlo Park, Pizza Hut would be presented in priority compared to Dominos. In other embodiments, Pizza Hut might not be listed at all if there is no Pizza Hut in Menlo Park. The fact that Pizza Hut's response rate was higher would not be relevant because those responses were generated for Pizza Hut locations outside of Menlo Park.

The system can also take into account payments from advertisers. For example, if two pizza establishments in Menlo Park each had five hundred requests, but one establishment offered a payment for priority, that establishment could be listed before the other.

Also, before the listings are presented, some embodiments provide for a paid advertisement to be presented to the caller. In some embodiments of the present invention, the presentation is also a function of payments offered by one or more businesses in the category. The presentation order may also be based on a characteristic associated with a subset of callers. Finally, the frequency of responses to advertisements may be adjusted to account for excessive numbers of responses originating from her particular phone number. For example, fifty responses were reported in relation to the one thousand times a Dominos Pizza advertisement was played during a particular time period. However, if the system determines that twenty of those responses came from one phone number, the system may not track those, reducing the response rate to three percent.

Additionally, some embodiments of the invention provide for varying levels of ranking prioritization. For example, a request for Dominos in Menlo Park may affect the ranking of the Dominos in Palo Alto but not the Dominos in Los Angeles. More specifically, the system may take into account the distance between geographies when calculating a ranking. In some embodiments, only requests or affirmative actions regarding a business in a particular geography will be tabulated. In other embodiments, some consideration will be made for the fact that a business was requested (or affirmative actions taken in regards to that business) even if it was in a different geography. The system may apply weights that apply differential weightings based on distance or any other variable.

It should be appreciated that the specific steps illustrated herein provide a particular flow according to one embodiment of the present invention. Other sequences of steps may also be performed according to alternative embodiments. For example, alternative embodiments of the present invention may perform the tracking and presentation steps outlined above in a different order. For example, the order in which the frequency tracking may be varied, with the defining a plurality of business categories performed prior to, during or after the tracking. Moreover, the individual steps illustrated herein may include multiple sub-steps that may be performed in various sequences as appropriate to the individual step. For example, in step 1112, the presentation of an advertisement to the caller may be defined in various sequences within the scope of the present invention. Furthermore, additional steps may be added or removed depending on the particular applications. One of ordinary skill in the art would recognize many variations, modifications, and alternatives.

Performance, Scalability, and Stability

In general, the user experience of this system is performance sensitive, which may raise a number of issues:

A "lag" between user interactions may be accompanied by a brief "hold music" sequence from the IVR to let users know they are still connected and the system is working.

Database servers will generally be tuned for maximum performance. Most queries in this system are reads and not writes, so only databases and tables which need constant writes (i.e. the session history database) would typically have full transaction commit/rollback enabled. Other tables can operate in less "safe" manner because data is only being accessed, not written. Additionally, the most time critical tables—specifically in the Advertiser Preferences DB—will be locked in memory with caching tuned for maximum speed.

If this performance is not sufficient, a faster database option may be used for lookups, including an object database or LDAP. This will usually change the syntax of the queries and the example in Selecting Advertisements but not the nature of it.

The exemplary embodiment provides for an XML API which may not be optimal from a performance perspective but does offer the advantages of ubiquity, ease of Advertiser implementation, and ease of debugging. A binary API can also be utilized.

The Advertiser Preferences Server is not hosted on the system network, and as such may not be reliably reachable in time to process the advertisement. The InfoAd Server will have a set timeout for replies from the Advertiser Preferences Servers, after which it stops taking responses and processes the call.

The InfoAd XML API presently returns acceptable ads, in the same way that the Advertiser Preferences DB returns acceptable results. For performance reasons the API is defined in some embodiments such that it returns no more than the number of Advertisements that can be played in the course of a single Session. It may be 1 or 2—one for getting directory information and a second for getting the call forwarded.

This design assumes that the IVR will not take any action without immediate direction from the InfoAd server. However, most IVRs have intelligent capabilities. For performance reasons the InfoAd server may give more complicated and longer-reaching directions than just one step, which would reduce the amount of back-and-forth communication between the components.

Forwarding of calls to a final destination typically ties up two ports on the switch to the external world—one inbound from the User and another outbound to the final destination. This may result in port shortages. In that case, an exemplary embodiment provides for the InfoAd server to monitor the available ports on the switch and not offer call forwarding when ports are limited.

Traditional calling systems have attempted to match the incoming call to a known pre-specified user profile, generally by using a pin code or potentially using a straight ANI match in conjunction with a pin code or other user specific code. This process is fast but does not indicate the actual identify the caller unless the caller affirmatively confirms his or her identity.

Embodiments of the present invention extend the traditional model of caller identification by logging useful characteristics of the session and, providing for the ability to use the ANI without the requirement of pin codes and to cross index the ANI with a separate database of customer-characteristic variables associated with a particular phone number. Embodiments of the present invention also extend the traditional model of caller identification by providing a robust architecture whereby advertising content can be appropriately targeted even without specific confirmation of the caller's identity. Moreover, while an Advertiser specified ANI match provides for robust matching, the InfoAd system allows the Advertiser to make judgments on what Advertisement to play based on additional available information. For example, if the Advertiser wishes to reach the female member of the household at a specific phone number, the InfoAd server provides the ANI and gender of the caller to the Advertiser, succeeding where a straight ANI match would fail.

For sessions where the system relies only on the Remote Advertiser Preferences Server, there may not be clear visibility into Advertiser decisions. However, visibility will emerge with respect to the outward performance of the algorithms when the rules are run on the InfoAd server. If an Advertiser delivers rules that are too computationally intensive for the system, these rules may need to be refused.

The system is designed on the assumption that the failure of any single hardware or software component is an undesirable but not unexpected event, and the system can continue operating.

The switches and databases use their native hot failover system to continue operation on one more or backup units.

The InfoAd Server and CSR Application Server are clusters of machines which operate in a relatively stateless manner by storing all states in databases. The servers are designed using a transaction model supporting concurrent access from multiple machines, and handles contention issues between the machines of the same type. It is assumed that direction of a request to a specific machine in the InfoAd Server cluster or CSR Application Server cluster is handled via DNS round-robin, but we may replace this with a load balancing network distributor if performance needs warrant.

INFOAD XML API

To ease general compatibility with existing corporate systems, the first implementation is a SOAP based API. However, the system does not depend on this specific technology and it may be changed to another protocol (XML-RPC, a custom XML API, a custom binary API, or another standard calling API such as CORBA) as needed. For these purposes, the SOAP libraries from the sender and receiver handle the specific XML formatting of the API, but the data types are defined.

The API behavior is straightforward: the InfoAd server opens an HTTP connection to the Advertiser Preferences Server, uses the POST method to send a SessionModel object, and then the Advertiser Preferences Server returns the AdsToPlay object.

The Session Model is defined by:

```
<complexType name="SessionModel">
    <sequence>
        <element name="parameter" minOccurs="0"
  maxOccurs="unbounded">
            <complexType>
                <sequence>
                    <element name="key" type="anyType" />
                    <element name="value" type="anyType" />
                </sequence>
            </complexType>
        </element>
    </sequence>
</complexType>
```

The Advertiser Preferences Server can be queried with no session information. This is allowable because, although it is not the most likely scenario (i.e., requiring no caller ID, unreliable DNIS information, and unreliable gender matching, and other conditions to all be true simultaneously), some advertisers may wish to advertise to everyone regardless of information confidence.

In one embodiment, the list of Advertisements to play is defined as:

```
<complexType name="AdsToPlay">
    <element name="version" type="xs:positiveInteger" />
    <sequence>
        <element name="parameter" minOccurs="0" maxOccurs="2">
            <complexType>
                <sequence>
                    <element name="adid" type="xs:positiveInteger" />
                    <element name="priority" type="xs:positiveInteger" />
                </sequence>
```

-continued

```
            </complexType>
        </element>
    </sequence>
</complexType>
```

The version parameter is included as a check on the later contents of the structure. If the constraints of the API are revised to allow more advertisements to be listed, the version # may be incremented to allow the InfoAd server to validate the input. The version parameter also allows for the availability of different levels of service to different customers, and to "beta test" some versions of the API without requiring different systems The minOccurs and maxOccurs flags are based on current behavior—the Advertiser could request as few as no advertisements and as many as two. Should the number of allowed advertisements be increased, maxOccurs will generally be increased and the required version incremented as well.

The adid element is the serial number for an Advertisement that the Advertiser has provided. The adid elements are paired with priority elements indicating the order in which to prefer Advertisements. Lower is more desirable.

Embodiments of the present invention provide the option of adding additional information to the call flow as technology allows and Advertisers request. For example:

Mobile network providers are currently deploying Global Positing System (GPS) enabled phones to their customer base and may make GPS data available to call recipients. As described earlier, if the system can access GPS data for a caller, the GPS data will be added to the Session Model as soon as the InfoAd server is aware of the GPS data. A similar result can be achieved with technologies that substitute for GPS.

Affirmative Actions may be varied to meet the needs of Advertisers. For example, an Affirmative Action could direct a caller to call flow subroutine specified for that Advertiser, such an informational recording stored on the InfoAd server ("press * to hear more information") or a request for more information ("press # to have a representative call you about our service") complete with an information gathering phase (e.g. a phone number to call back, best times to call, etc.).

Other Applications

The above exemplary embodiments have assumed that the entire system interface is contained within a voice response scenario. However, this is not required by the present invention. For example, a number of other related scenarios are well within the contemplation of embodiments of the present invention:

Mobile phone users on high speed data networks ("3G", etc.) may be presented with a video advertisement, or presented with choices or Affirmative Actions by way of an interactive interface on their handset.

Mobile phone users may receive their search results via electronic form. Current examples of electronic forms include SMS and email.

One having ordinary skill in the art will also appreciate that the advertisement content could be both aural as well as visual including, but not limited to broadcasting messaging content to the user's cell phone display or embedded ad links that the cell phone user could click on to generate a phone call to the advertiser.

Users on new voice over IP (VoIP) networks may be presented with options which result in further routing to applications on an IP network rather than merely using IP as a proxy for voice transit on the PSTN.

Though these optional examples may use different protocols than those described above, the above scenarios are based on currently available technology. Moreover, it is expected that the ongoing increase in data and voice convergence will stimulate market demand for the delivery of the InfoAd service in related manifestations via different user interfaces. One having ordinary skill in the art will appreciate that the system framework disclosed herein can be adapted to such emerging uses.

The following examples provide illustrations of a typical user experience in various call settings. Although the examples illustrated below provide a number of steps, it is understood that additional steps may be added or illustrated steps may be subtracted within the scope of embodiments of the present invention. Thus, the examples are not limited to the steps illustrated below. Moreover, the order in which various steps are performed is modified in some embodiments of the present invention. These examples are merely provided by way of example and one of ordinary skill in the art would recognize many variations, modifications, and alternatives.

Illustrative User Experience: Calling for a Residential Listing
    Caller dials a toll free number
    Caller is greeted with an automated voice prompt "Thank you for calling free directory assistance."
    Operator or Automated voice says, "What city and state please"
    Caller responds, "Oakland, Calif."
    Operator or Automated voice says, "Are you looking for a business or residence?
    Caller says, "Residence. I want the number of John Smith"
    Operator states, "Is it the Mr. Smith on Avenue A or Boulevard B?"
    Caller states, "Avenue A"
    Operator states, "Thank you. Please hold"
    Caller hears an automated voice, "Your free 411 call was made possible by ACME Corp. ACME now offers new users 3 months of free service.
The number you requested is 650-321-9050.
Now press star to hear more about your special offer.
    Caller presses "star"
    Caller holds and then hears a live operator, "This is Bob from Acme Corp. May I tell you more about your special offer of 3 months free service?"

Typical User Experience: Calling for a Specific Business Listing
    Caller dials a toll free number
    An automated voice prompt, "Thank you for calling free directory assistance."
    Operator or Automated voice prompt, "What city and state please"
    Caller responds, "Menlo Park, Calif."
    Operator or Automated voice prompt, "Business or residential please"
    Caller responds, "Business"
    Operator or voice prompt says, Name the particular business or say the type of business"
    Caller says, "I want the Pizza Hut on Santa Cruz Avenue"
    Operator states, "Checking. Please hold"
    Caller hears an automated voice, "Your free 411 call was made possible by Dominos Pizza. Dominos now offers you $4.00 off every large pizza. The number you requested is 650-321-9050.
Now press star to be connected to the nearest Dominos and hear more about your special offer Typical User Experience: Calling for a Business Category Listing
    Caller dials a toll free number
    Caller is greeted with an automated voice prompt "Thank you for calling free directory assistance."
    Operator or Automated voice says, "What city and state please"
    Caller responds, "Menlo Park, Calif."
    Operator or Automated voice says, "Business or residential please"
    Caller responds, "Business"
    System says, "Name the particular business or say the type of business"
    Caller, "I need a florist in Menlo Park"
    Operator states, "Thank you. Please hold"
    Caller hears an automated voice, "Your free 411 call was made possible by Menlo Flowers. Menlo Flowers now offers you free delivery on any order over $25. Hold the line for Menlo Flowers or press star to hear several other listings in your category."
    Caller does nothing and is connected to Menlo Flowers.
    [Alternatively] Caller presses star and hears the automated voice, "You will now hear several selected businesses. Press one when you hear the business you want to be connected to or press pound to start over: Atherton Rose Gallery . . . Palo Alto Magic Bouquets . . . Baxter Tulips . . . El Camino Flowers . . . Menlo Flowers" [Note that pressing one effects a live transfer]

After pressing star, the list of business heard by the caller need not be randomly or alphabetically ordered, as is the case in the present art. Rather, in accordance with some embodiments of the present invention, the listings will be ordered either entirely or partially in accordance with observed frequency of requests 800 wherein this is a function of how often the population of callers—or some subset thereof—have requested that particular business or have taken affirmative actions in regard to this business in the past.

Typical user experience: Calling from a cellular phone (the first time or at some point following a specified number of calls)
    Caller dials a toll free number
    Caller is greeted with an automated voice prompt "Thank you for calling free directory assistance. To continue using our free service, we do request our cellular users to enter their home phone number just once every 12 months. This information is kept private. Please key in your ten digit home phone number now followed by the pound key. [Long Pause] If you do not have a home phone, press star now.
    Caller keys in residential number and proceeds with normal sequence: System asks: "What city and state please"
    [Alternatively]
    Caller presses star
    System says, "Please proceed to obtain your free directory assistance"
    What city and state please . . .
    Caller says, "I don't have a landline at home. I only have a cellular number"
    Operator says, "Please accept our apologies for the inconvenience. The system will no longer ask you for your home phone number."

Note that in one embodiment, the caller is offered an incentive to enter his or her residential telephone number on the cellular key pad.

The present invention is not limited to these concepts. Moreover, although these concepts are listed individually and separately, embodiments of the present invention may combine them, adding additional concepts, or deleting concepts are appropriate to the application. These concepts are merely examples and one of ordinary skill in the art would recognize many variations, modifications, and alternatives.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A method of operating a directory assistance system, the method comprising:
    obtaining a plurality of business listings each of which are associated with at least one category of business;
    receiving a plurality of directory assistance requests at said directory assistance system, each request for one of said plurality of business listings, the plurality of directory assistance requests coming from a plurality of callers;
    tracking by a server at said directory assistance system, a frequency of requests from said plurality of callers for said plurality of business listings;
    receiving at said directory assistance system at least one additional business category request from a subsequent caller, said additional business category request including a business category; and
    presenting by said directory assistance system a responsive list of business listings, associated with said business category, to said subsequent caller making said additional business category request, wherein said responsive list has an order of presentation based on said frequency of requests of said business listings in said responsive list as tracked by the server.

2. The method of claim 1 further comprising:
    receiving at least one paid advertisement; and
    presenting the at least one paid advertisement to the caller.

3. The method of claim 1 wherein, at least one of said plurality of businesses makes a payment, and the order of presentation is also based on said payment.

4. The method of claim 1, further comprising the step of defining a characteristic and using a database server to collect information on whether said characteristic pertains to each caller, wherein said order of presentation is also based on whether said characteristic pertains to said caller, according to said database server.

5. The method of claim 4 wherein said characteristic is at least one of demographic, geographic, and psychgraphic.

6. The method of claim 1 wherein the information requested regarding at least one of a plurality of businesses is at least one of an address, a phone number, a product review, or a service review of a business.

7. The method of claim 1 wherein presenting a listing of businesses to the caller is performed in at least one of visual or aural format.

8. The method of claim 1 wherein the frequency is adjusted to account for a number of requests originating from a particular phone number during a period of time.

9. A method of operating a directory assistance system, the method comprising:
    obtaining a plurality of business listings each of which are associated with at least one category of business;
    receiving at said directory assistance system a plurality of business category requests from a plurality of callers, the requests including a request for business listings from one business category;
    presenting by said directory assistance system to each of said plurality of callers a list of business listings from said business category in response to each of said requests;
    providing by said directory assistance system an option to each of said plurality of callers to select a business from said list;
    establishing a response rate by a server by tracking the number of times a business listing is selected by said plurality of callers from said list;
    said directory assistance system receiving an additional business category request from a subsequent caller requesting a business listing from one of said business categories; and
    said directory assistance system presenting a responsive list of businesses from said one business category in response to the additional directory assistance request, wherein said responsive list has an order of presentation based on said response rate of said business listings on said responsive list, as tracked by said server.

10. The method of claim 9 further comprising:
    receiving at least one paid advertisement; and
    presenting the at least one paid advertisement to the caller.

11. The method of claim 9 wherein at least one of said plurality of businesses makes a payment, and said order of presentation is also based on said payment.

12. The method of claim 9, further comprising the step of defining a characteristic and using a database server to collect information on whether said characteristic pertains to each caller, wherein said order of presentation is also based on whether said characteristic pertains to each caller, according to said database server.

13. The method of claim 12 wherein the characteristic is at least one of demographic, geographic, and psychgraphic.

14. The method of claim 9 wherein presenting a listing of businesses to the caller is performed in at least one of visual or aural format.

15. The method of claim 9 wherein the response rate is adjusted to account for a number of responses originating from a particular phone number during a period of time.

16. A method of operating a directory assistance system, the method comprising:
    obtaining a plurality of business listings each of which are associated with at least one category of businesses;
    receiving at said directory assistance system a directory assistance call from a plurality of callers requesting information;
    in addition to a response to said directory assistance response, presenting by said directory assistance system advertisements from business listings to said plurality of callers;
    tracking by a server at said directory assistance system a response rate to said advertisements for each business listing presented as advertisements;
    receiving at said directory assistance system an additional business category request from a subsequent caller requesting a business listing from a business category; and
    said directory assistance system presenting a responsive list of business listings to said subsequent caller in response to said additional business category request, wherein said responsive list has an order of presentation based on said response rate to said advertisements of said business listings on said responsive list, as tracked by said server.

17. The method of claim 16 wherein the information comprises a least one of a name, an address, a phone number, a product review, or a service review of a business.

18. The method of claim 16 further comprising:
receiving at least one paid advertisement; and
presenting the at least one paid advertisement to the caller.

19. The method of claim 16 wherein the advertisement was presented to a previous caller in a directory assistance business category request.

20. The method of claim 16 wherein the advertisement was presented to a previous caller in a directory assistance request for information regarding a business.

21. The method of claim 16 wherein establishing the order of presentation is based in part on a payment provided by the businesses.

22. The method of claim 16 wherein the order of presentation is additionally based on a characteristic associated with a subset of callers selected from the group of callers.

23. The method of claim 16 wherein said response rate is adjusted to account for a number of responses originating from a particular phone number during a period of time.

\* \* \* \* \*